United States Patent
Jain et al.

(10) Patent No.: US 10,028,096 B2
(45) Date of Patent: Jul. 17, 2018

(54) ROBUST REFERENCE SIGNAL TIME DIFFERENCE MEASUREMENTS

(71) Applicant: QUALCOMM Incorporated, San Diego, CA (US)

(72) Inventors: Amit Jain, San Diego, CA (US); Harisrinivas Chandrasekar, San Diego, CA (US); Borislav Ristic, Del Mar, CA (US); Dinesh Subramani, San Diego, CA (US); Gautam Nirula, San Diego, CA (US); Prabhu Kandasamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/257,808

(22) Filed: Sep. 6, 2016

(65) Prior Publication Data

US 2018/0070209 A1 Mar. 8, 2018

(51) Int. Cl.
*H04W 24/00* (2009.01)
*H04W 4/02* (2018.01)
(Continued)

(52) U.S. Cl.
CPC .............. *H04W 4/025* (2013.01); *G01S 5/10* (2013.01); *H04W 24/08* (2013.01); *G01S 5/02* (2013.01)

(58) Field of Classification Search
CPC ......... H04W 4/025; H04W 24/08; G01S 5/10; G01S 5/02
(Continued)

(56) References Cited

U.S. PATENT DOCUMENTS 9,338,591 B1 * 5/2016 Vivanco .................. H04W 4/02
9,594,149 B2 * 3/2017 Siomina ................ G01S 5/0252
(Continued)

FOREIGN PATENT DOCUMENTS

EP        2569974 A1      3/2013

OTHER PUBLICATIONS

ETSI: "ETSI TS 136 133 V13.2.0", ETSI Technical Specification, Apr. 1, 2016, pp. 1-1518, XP055352922, Retrieved from the Internet: URL:http://www.etsi.org/deliver/etsi_ts/136100_136199/13613113.02.00_60/ts_136133v130200p.pdf [retrieved on Mar. 8, 2017].
(Continued)

*Primary Examiner* — Mong-Thuy Tran
(74) *Attorney, Agent, or Firm* — Silicon Valley Patent Group LLP

(57) ABSTRACT

Disclosed embodiments pertain to combining Reference Signal Time Difference (RSTD) measurements from partial measurement sessions that result when a single measurement session is interrupted by one or more interruption events including Out of Service (OOS) or Inter-Frequency Handover (IFH) events. In some embodiments, first Time Of Arrival (TOA) measurements of cellular signals during a plurality of discontiguous partial measurement sessions separated by one or more interruption events may be obtained. Second TOA measurements based on a reference time source may be obtained for a plurality of the first TOA measurements from at least two partial measurement sessions. A cell associated with a second TOA measurement may be selected as a reference cell and for each non-reference cell associated with a second TOA measurement, a corresponding RSTD measurement may be obtained relative to the selected reference cell.

30 Claims, 11 Drawing Sheets

(51) Int. Cl.
*H04W 24/08* (2009.01)
*G01S 5/10* (2006.01)
*G01S 5/02* (2010.01)

(58) Field of Classification Search
USPC ...................................................... 455/456.2
See application file for complete search history.

(56) References Cited

U.S. PATENT DOCUMENTS

| | | |
|---|---|---|
| 2011/0250887 A1 | 10/2011 | Tenny |
| 2011/0269477 A1 | 11/2011 | Annamalai et al. |
| 2012/0083221 A1 | 4/2012 | Banta-Aho et al. |
| 2012/0165012 A1* | 6/2012 | Fischer ............... G01S 5/0242 455/435.1 |
| 2012/0307670 A1 | 12/2012 | Kazmi et al. |
| 2013/0065612 A1* | 3/2013 | Siomina ............... H04W 24/10 455/456.2 |
| 2014/0200016 A1* | 7/2014 | Siomina ............... H04W 24/08 455/450 |
| 2015/0018010 A1 | 1/2015 | Fischer et al. |
| 2015/0071101 A1* | 3/2015 | Mager ................. H04W 24/10 370/252 |
| 2015/0092708 A1* | 4/2015 | Su ....................... H04W 76/026 370/329 |
| 2015/0230112 A1 | 8/2015 | Siomina et al. |
| 2016/0066168 A1* | 3/2016 | Fodor .................. H04W 4/023 455/404.1 |
| 2016/0105831 A1 | 4/2016 | Masini et al. |
| 2017/0094576 A1* | 3/2017 | Kazm .................. H04W 36/30 |
| 2017/0150436 A1* | 5/2017 | Modarres Razavi . H04W 48/20 |

OTHER PUBLICATIONS

International Search Report and Written Opinion—PCT/US2017/046720—EPO—Nov. 7, 2017.

* cited by examiner

ROBUST REFERENCE SIGNAL TIME DIFFERENCE MEASUREMENTS

FIELD

The subject matter disclosed herein relates to location determination based on robust reference signal time difference measurements.

BACKGROUND

It is often desirable to know the location of a terminal such as a cellular phone. For example, a location services (LCS) client may desire to know the location of a terminal in case of an emergency services call, or to provide location based services such as navigation assistance or direction finding. The terms "location" and "position" are synonymous and are used interchangeably herein.

In Observed Time Difference of Arrival (OTDOA) based positioning, the mobile station may measure time differences in received signals from a plurality of base stations. Because positions of the base stations can be known, the observed time differences may be used to calculate the location of the terminal. To further help location determination, Positioning Reference Signals (PRS) are often provided by a base station (BS) in order to improve OTDOA positioning performance. The measured time difference of arrival of the PRS from a reference cell (e.g. the serving cell) and one or more neighboring cells is known as the Reference Signal Time Difference (RSTD). Using the RSTD measurements for two or more neighbor cells, the absolute or relative transmission timing of each cell, and the known position(s) of BS physical transmitting antennas for the reference and neighboring cells, the position of the User Equipment (UE) or Mobile Station (MS) may be calculated. Using (i) the RSTD measurements, (ii) the absolute or relative transmission timing of each neighboring cell, and (iii) the known position(s) of BS physical transmitting antennas for the reference and neighboring cells, the UE's position may be determined.

A UE may encounter one or more LTE Inter-Frequency Handover (IFH) or Out Of Service (OOS) events during an OTDOA measurement session. OOS events lead to a loss of service. IFH events occur when one or more neighbor cells operate on a different carrier frequency than the serving cell. Upon encountering an IFH or OOS event, UEs may obtain or report: (a) RSTD measurements prior to the event; or (b) RSTD measurements subsequent to the event after resumption of LTE service, and prior to another event or expiry of the OTDOA session; or (c) no RSTD measurements, in situations where an inadequate number of measurements were obtained during periods of LTE service.

The exemplary situations outlined above may result in one of: (a) stale RSTD measurements, or (b) fewer RSTD measurements, or (c) no RSTD measurements, thereby detrimentally impacting UE position determination. For example, intermittent loss of LTE service during an emergency (e.g. 911) call may severely impact position determination thereby affecting delivery of emergency or other services.

SUMMARY

In some embodiments, a method on a User Equipment (UE) may comprise: determining a plurality of sets of first time of arrival (TOA) measurements of cellular signals during a measurement session, wherein each first TOA measurement corresponds to a cell, and each set of first TOA measurements corresponds to a distinct partial measurement session in a plurality of discontiguous partial measurement sessions separated by one or more interruption events. The method may further comprise: determining, for a plurality of first TOA measurements from two or more of the plurality of sets of first TOA measurements, corresponding second TOA measurements, the corresponding second TOA measurements being determined based on a reference time source; selecting, as a reference cell, a cell associated with a second TOA measurement; and determining, for each non-reference cell associated with a corresponding second TOA measurement, a corresponding reference signal time difference (RSTD) measurement relative to the selected reference cell.

In another aspect, a UE may comprise: a processor coupled to a memory, wherein the processor is configured to: determine a plurality of sets of first time of arrival (TOA) measurements of cellular signals during a measurement session, wherein: each first TOA measurement corresponds to a cell, and each set of first TOA measurements corresponds to a distinct partial measurement session in a plurality of discontiguous partial measurement sessions separated by one or more interruption events. The processor may be further configured to: determine, for a plurality of first TOA measurements from two or more of the plurality of sets of first TOA measurements, corresponding second TOA measurements, the corresponding second TOA measurements being determined based on a reference time source; select, as a reference cell, a cell associated with a second TOA measurement; and determine, for each non-reference cell associated with a corresponding second TOA measurement, a corresponding reference signal time difference (RSTD) measurement relative to the selected reference cell.

In a further aspect, a UE may comprise: means for determining a plurality of sets of first time of arrival (TOA) measurements of cellular signals during a measurement session, wherein: each first TOA measurement corresponds to a cell, and each set of first TOA measurements corresponds to a distinct partial measurement session in a plurality of discontiguous partial measurement sessions separated by one or more interruption events. The UE may further comprise: means for determining, for a plurality of first TOA measurements from two or more of the plurality of sets of first TOA measurements, corresponding second TOA measurements, the corresponding second TOA measurements being determined based on a reference time source; means for selecting, as a reference cell, a cell associated with a second TOA measurement; and means for determining, for each non-reference cell associated with a corresponding second TOA measurement, a corresponding reference signal time difference (RSTD) measurement relative to the selected reference cell.

In some embodiments, a non-transitory computer-readable medium comprising executable instructions to configure a processor to: determine a plurality of sets of first time of arrival (TOA) measurements of cellular signals during a measurement session, wherein: each first TOA measurement corresponds to a cell, and each set of first TOA measurements corresponds to a distinct partial measurement session in a plurality of discontiguous partial measurement sessions separated by one or more interruption events. The executable instructions may further configure the processor to: determine, for a plurality of first TOA measurements from two or more of the plurality of sets of first TOA measurements, corresponding second TOA measurements, the corresponding second TOA measurements being determined based on a reference time source; select, as a reference cell, a cell associated with a second TOA measurement; and determine, for each non-reference cell associated with a corresponding second TOA measurement, a corresponding reference signal time difference (RSTD) measurement relative to the selected reference cell.

The methods disclosed may be performed by one or more of servers including location servers, mobile stations, etc. using LPP, LPPe or other protocols. Embodiments disclosed also relate to software, firmware, and program instructions created, stored, accessed, read or modified by processors using non-transitory computer readable media or computer readable memory.

DETAILED DESCRIPTION

Figure 1:
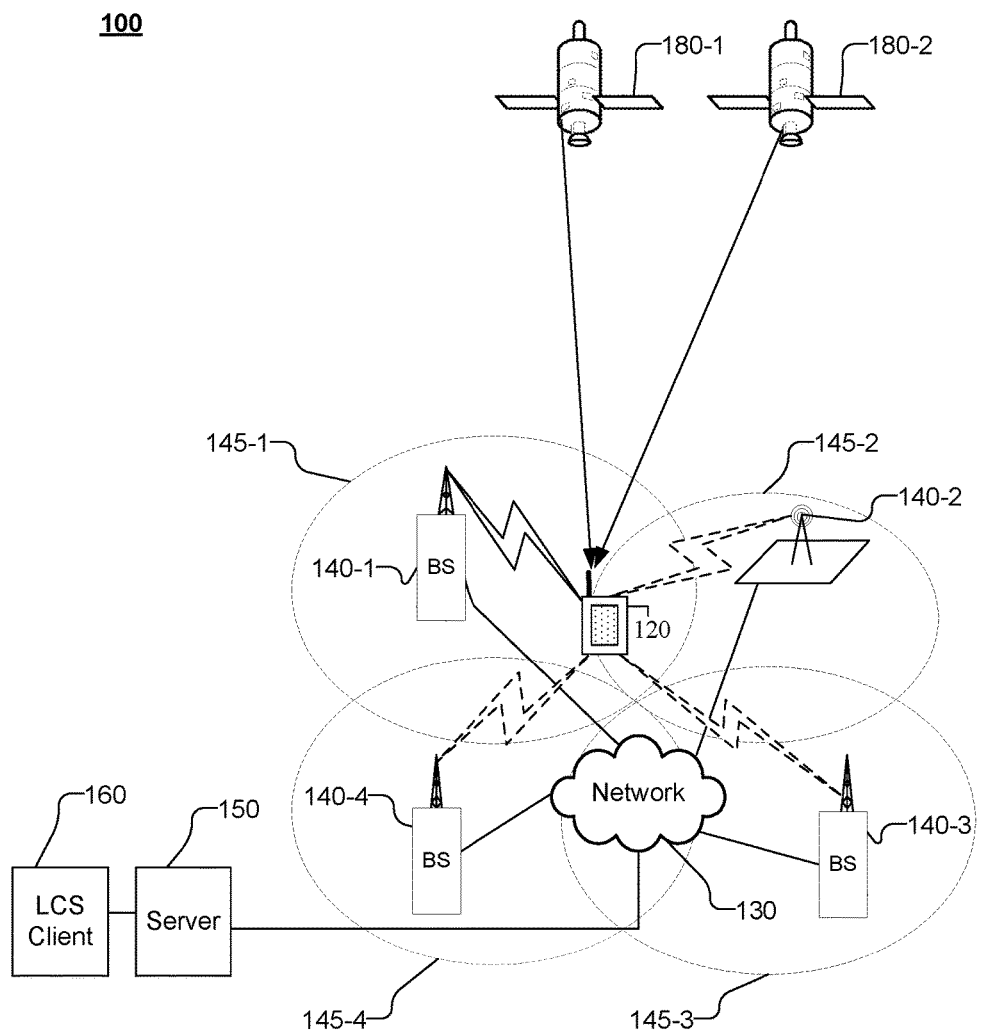
FIG. 1 shows an architecture of an exemplary system 100 capable of providing Location Services to UE 120 including the transfer of location assistance data or location information.

The Reference Signal Time Difference (RSTD) for a cell "i" relative to a reference cell "Ref", may be given as $(TOA_i - TOA_{Ref})$, where $TOA_i$ is the time of arrival of a reference signal (e.g. PRS, CRS, synchronization signals) from cell i and $TOA_{Ref}$ is the time of arrival of a reference signal (e.g. PRS, CRS, synchronization signals) from the reference cell. The process of obtaining and reporting RSTD measurements is termed OTDOA. Based on RSTD measurements from two or more base stations (e.g. enhanced Node Bs or "eNodeBs" or "eNBs"), the location of a UE may be determined (e.g. using multilateration). The RSTD measurements may be obtained during a measurement session. The term "measurement session" is used to refer to a contiguous time period during which a UE measures and reports TOA/RSTD parameters, which may used to determine a location of the UE. A measurement session may be an OTDOA session, and or some specified or predetermined time window. For example, the time available for the measurement session may be specified by one of: a protocol and/or a standard (e.g. LTE/LPP/LPPe etc) used by one or more of the UE/base stations/network; and/or by an entity requesting the measurements (e.g. a location server or other network entity); and/or by communication/negotiation between the UE and an entity requesting measurements or involved in the location determination.

In some embodiments disclosed herein, RSTD measurements obtained prior to interrupting events during a measurement session (e.g. OTDOA session) may be combined with RSTD measurements subsequent to the interrupting events during the same measurement session. In some embodiments, one or more measurements from prior to an OOS/IFH event during the measurement session may be combined with measurements subsequent to the OOS/IFH event during the measurement session based on at least one reference clock source or reference time source (hereinafter "reference time source"). For example, a single measurement session may be interrupted by one or more OOS/IFH events resulting in a plurality of partial measurement sessions. In some embodiments, measurements from two or more of the partial measurement sessions may be combined based on a reference time source.

In some embodiments, one or more of the following reference time sources may be used to combine measurements obtained during an OTDOA session: (A) Global Navigation Satellite System (GNSS) Real Time Clock (RTC) or GNSS system time (e.g. the UE may include and/or be coupled to an GNSS receiver) (B) UE/system clock (e.g. an onboard crystal oscillator); (C) CDMA system time from LTE System Information Block 8 (SIB8) message; or (D) GNSS system time from LTE System Information Block 16 (SIB16) message. In some embodiments, the UE may report the combined measurements in a measurement report. In some embodiments, the measurement report may be submitted according to a appropriate protocol, relevant standard, specified time, and/or prior to the end of the measurement session.

The terms "mobile station" (MS), "user equipment" (UE) or "target" are used interchangeably herein and may refer to a device such as a cellular or other wireless communication device, personal communication system (PCS) device, personal navigation device (PND), Personal Information Manager (PIM), Personal Digital Assistant (PDA), laptop, cell phone, smartphone, tablet, tracking device, or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms MS, UE, "mobile station" or "target" are intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "mobile station."

In the figures and description below, like numbered entities in different figures may correspond to one another. Different instances of a common type of entity may be indicated by appending an additional label to a label for the common entity. For example, different instances of a base station 140 may be labeled 140-1, 140-2 etc. When referring to a common entity without the additional appended label (e.g. base station 140), any instance of the common entity can be applicable.

FIG. 1 shows an architecture of a system 100 capable of providing Location Services to UE 120 including the transfer of location assistance data or location information, using messages such as Long Term Evolution (LTE) Positioning Protocol (LPP) or LPP extensions (LPPe) messages between UE 120 and server 150, which, in some instances, may take the form of a Location Server (LS) or another network entity. The transfer of the location information may occur at a rate appropriate to both UE 120 and server 150. LPP is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message. In general, a positioning protocol such as LPP and LPPe may be used to coordinate and control position determination. The positioning protocol may define: (a) positioning related procedures that may be executed by a location server (LS) and/or a UE; and/or (b) communication or signaling related to positioning between the LS and UE.

In Control Plane (CP) positioning, the signaling used to initiate a positioning event and the signaling related to the positioning event occur over the control channels of the cellular network. In CP positioning, the LS may include or take the form of an E-SMLC.

In User Plane (UP) positioning such as Secure User Plane Location (SUPL) positioning, signaling to initiate and perform Location Based Services (LBS) functions may utilize user data channels and appear as user data. In UP positioning, the location server may include or take the form of a SUPL Location Platform (SLP).

In the case of LPPa, the protocol may be used between an LS (e.g. an Enhanced Serving Mobile Location Center or "E-SMLC") and a BS (e.g. an eNodeB) to enable the LS to request and receive configuration information for the BS (e.g. details of PRS signals transmitted) and positioning measurements made by the BS of a UE.

For simplicity, only one UE 120 and server 150 are shown in FIG. 1. In general, system 100 may comprise multiple cells indicated by 145-$k$ (0≤$k$≤$N_{cells}$, where $N_{cells}$ is the number of cells) with additional networks 130, LCS clients 160, mobile stations 120, servers 150, base stations/antennas (hereinafter "base stations") 140, and Space Vehicles (SVs) 180 (e.g. satellites). System 100 may further comprise a mix of cells including macrocells such as cells 145-1, 145-3, and 145-4 along with femtocells such as cell 145-2 in a manner consistent with embodiments disclosed herein. In some instances, femtocell 145-2 (or another cell) may operate on a different frequency than cell 145-1 serving UE 120. For example, system 100 may take the form of a heterogeneous network, which may include cells of different power and size such as macro-cells, micro-cells, pico-cells, and femto-cells. The term "cell," as used herein, refers to any of the types of cells above. In a heterogeneous network, the prefixes macro, micro etc. may characterize base station power. The coverage area or cell size may depend on base station power, antenna location(s), and various other environmental factors.

UE 120 may be capable of wirelessly communicating with server 150 through one or more networks 130 that support positioning and location services, which may include but is not limited to the Secure User Plane Location (SUPL) location solution defined by OMA and the Control Plane location solution defined by 3GPP for use with an LTE serving network. For example, Location services (LCS) may be performed on behalf of LCS Client 160 that accesses server 150 (which may take the form of a location server) and issues a request for the location of UE 120. Server 150 may respond to LCS client 160 with a location estimate for UE 120. LCS Client 160 may also be known as a SUPL Agent—e.g. when the location solution used by server 150 and UE 120 is SUPL. In some embodiments, UE 120 may also include an LCS Client or a SUPL agent (not shown in FIG. 1) that may issue a location request to some positioning capable function within UE 120 and later receive back a location estimate for UE 120. The LCS Client or SUPL Agent within UE 120 may perform location services for the user of UE 120—e.g. provide navigation directions or identify points of interest within the vicinity of UE 120. Server 150 as used herein may be a SUPL Location Platform (SLP), an evolved Serving Mobile Location Center (eS-MLC), a Serving Mobile Location Center (SMLC), a Gateway Mobile Location Center (GMLC), a Position Determining Entity (PDE), a Standalone SMLC (SAS), and/or the like.

As illustrated in FIG. 1, the UE 120 may communicate with server 150 through network 130 and BS' 140, which may be associated with network 130. UE 120 may receive and measure signals from BS' 140, which may be used for position determination. For example, UE 120 may receive and measure signals from one or more of BS' 140-1, 140-2, 140-3, and/or 140-4, which may be associated with cells 145-1, 145-2, 145-3 and/or 145-4. In some embodiments, BS' 140 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN. In some embodiments, system 100 may form part of, comprise or contain an Evolved Packet System (EPS), which may comprise an evolved UMTS Terrestrial Radio Access Network (E-UTRAN) and an Evolved Packet Core (EPC). As another example, BS' 140 and network 130 may form part of, e.g., a W-CDMA UTRAN network, a GSM/EDGE Radio Access Network (GERAN), a 1×RTT network, an Evolution-Data Optimized (EvDO) network, a WiMax network or a WLAN.

UE 120 may also receive signals from one or more Earth orbiting Space Vehicles (SVs) 180-1 or 180-2 collectively referred to as SVs 180, which may be part of a satellite positioning system (SPS). SVs 180, for example, may be in a constellation of Global Navigation Satellite System (GNSS) such as the US Global Positioning System (GPS), the European Galileo system, the Russian Glonass system or the Chinese Compass or BeiDou system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 2A:
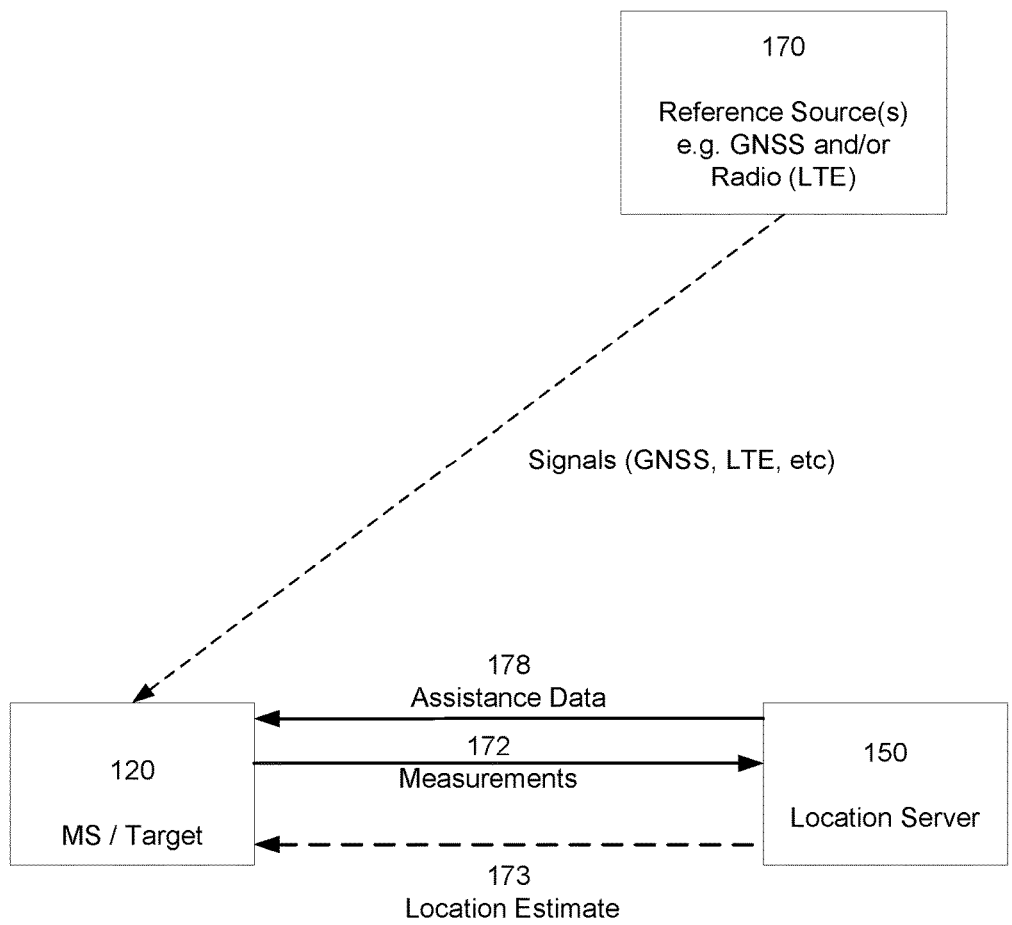
FIG. 2A shows a simplified block diagram illustrating some entities and messages exchanged in a system 175 capable of determining the location of UE 120.

FIG. 2A shows a simplified block diagram illustrating some entities and messages exchanged in a system 175 capable of determining the location of UE 120. Referring to FIG. 2A, server 150 and/or a base station may provide assistance data 172 to UE 120. Assistance data 172 may include OTDOA assistance data, location related information, such as an approximate location of UE 120, SPS assistance data, and/or other assistance data. Assistance data 178 may be used to assist UE 120 in acquiring and measuring signals from SVs 180 and/or BS' 140.

Based on received assistance data 178, UE 120 may measure reference signals (e.g. PRS, CRS, synchronization signals) from reference source(s) 170 to obtain measurements 172. Reference source(s) 170 may represent signals from SVs 180 and/or signals from one or more BS' 140 in network 130. Each BS 140 may be associated with at least one corresponding cell 145. UE 120 may obtain measurements 172 by measuring pseudo-range measurements for SVs 180 and/or OTDOA/RSTD related parameters from BS 140. For example, BS' 140 may transmit PRS signals, which may be measured by UE 120. Based on the measured PRS parameters, OTDOA/RSTD related parameters may be obtained by UE 120. For example, UE 120 may use the difference in the arrival times of downlink radio signals from a plurality of base stations (such as eNBs) to compute the user/MS position. For example, if a signal from cell 145-3 is received at time t1, and a signal from reference cell 145-1 is received at time t2, then the RSTD is given by t2−t1. Generally, t2 and t1 are known as Time Of Arrival (TOA) measurements. The OTDOA/RSTD related parameters may be sent to server 150 as measurements 172. Server 150 may use measurements 172 to derive a position estimate for UE 120. For example, in MS-assisted mode, measurements 172 may be used by server 150 to derive a location estimate of UE 120. In some embodiments, the location estimate may be optionally sent to UE 120 and/or a requesting entity such as LCS client 160 (not shown in FIG. 2).

In some embodiments, UE 120 may take the form of a Secure User Plane (SUPL) Enabled Terminal (SET) and may communicate with server 150 and use location assistance data 178 to obtain a location estimate for UE 120, which may then be communicated to LCS client 160 (not shown in FIG. 2). In some instances (e.g. in MS-based mode), when adequate information is available to UE 120 (e.g. in a Base Station Almanac) and/or through assistance data 178, UE 120 may determine a location estimate 173.

Referring to FIG. 1, in some embodiments, BS' 140-1-140-4 corresponding to cells 145-1-145-4, respectively, may also transmit Positioning Reference Signals (PRS). PRS, which have been defined in 3GPP Long Term Evolution (LTE) Release-9, are transmitted by a base station in special positioning subframes that are grouped into positioning occasions. For example, in LTE, the positioning occasion, $N_{PRS}$ can comprise 1, 2, 4, or 6 consecutive positioning subframes ($N_{PRS} \in \{1, 2, 4, 6\}$) and occurs periodically at 160, 320, 640, or 1280 millisecond intervals. The positioning occasions recur with PRS Periodicity $T_{PRS}$. In some embodiments, $T_{PRS}$ may be measured in terms of the number of subframes between the start of consecutive positioning occasions.

Within each positioning occasion, PRSs are transmitted with a constant power. PRS can also be transmitted with zero power (i.e., muted). Muting, which turns off a regularly scheduled PRS transmission, may be useful when PRS patterns between cells overlap. Muting aids signal acquisition by UE 120. Muting may be viewed as the non-transmission of a PRS for a given positioning occasion in a particular cell. Muting patterns may be signaled to UE 120 using bit strings. For example, in a bit string signaling a muting pattern, if a bit at position j is set to "0", then an MS may infer that the PRS is muted for the $j^{th}$ positioning occasion.

To further improve hearability of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. The frequency shift, in LTE, for example, is defined as a function of the Physical Cell Identifier (PCI) resulting in an effective frequency re-use factor of 6.

The PRS configuration parameters such as the number of consecutive positioning subframes, periodicity, muting pattern, etc. may be configured by network 130 and may be signaled to UE 120 (e.g. by server 150) as part of the OTDOA assistance data. For example, LPP or LPPe messages between UE 120 and server 150 may be used to transfer location assistance data 178 including OTDOA assistance data. OTDOA assistance data may include reference cell information and neighbor cell lists. The reference cell and neighbor cell lists may each contain the physical cell identities (PCIs) of the cells as well as PRS configuration parameters for the cells.

OTDOA assistance data are usually provided for one or more "neighbor cells" or "neighboring cells" relative to a "reference cell". PRS positioning by UE 120 may also be facilitated by including the serving cell in the OTDOA assistance data. For example, OTDOA assistance data may include "expected RSTD" parameters, which provide the UE information about the RSTD values the UE is expected to measure at its current location together with an uncertainty of the expected RSTD parameter. The expected RSTD together with the uncertainty defines then a search window for the UE where the UE is expected to measure the RSTD value. "Expected RSTDs" for cells in the OTDOA assistance data neighbor cell list are usually provided relative to an OTDOA assistance data reference cell. OTDOA assistance information may also include PRS configuration information parameters, which allow a UE to determine when a PRS positioning occasion occurs on signals received from various cells, and to determine the PRS sequence transmitted from various cells in order to measure a TOA.

Using the RSTD measurements, the absolute or relative transmission timing of each cell, and the known position(s) of BS physical transmitting antennas for the reference and neighboring cells, the UEs position may be calculated. RSTD for a cell "k" relative to a reference cell "Ref", may be given as ($TOA_k$–$TOA_{Ref}$). The time difference of arrival numbers are then converted to RSTD units, which are defined in appropriate standards/protocol documents and sent to the location server. Using (i) the RSTD measurements, (ii) the absolute or relative transmission timing of each neighboring cell, and (iii) the known position(s) of BS physical transmitting antennas for the reference and neighboring cells, the UE's position may be determined.

UEs may sometimes encounter one or more LTE IFH or OOS events during an OTDOA measurement session. OOS events may lead to a temporary loss of service. IFH events occur when one or more neighbor cells operate on a different carrier frequency than the serving cell. For example, in some situations, network 130 may consist of several frequency layers. As one example, the serving cell may belong to a frequency layer operating at frequency $f_i$, while one or more PRS' or assistance data cells may be deployed on an inter-frequency layer operating at frequency $f_j$, where $f_i@f_j$. Referring to FIG. 1, for example, macrocells 145-1, 145-3 and 145-4 may be operating on radio frequency $f_j$, while cell 145-2 may be operating on a radio frequency $f_i$. During an IFH event, UE 120 may stop listening to its current serving cell at frequency $f_i$ and/or taking OTDOA measurements of neighboring cells at frequency $f_i$, when it switches to frequency $f_j$. Thus, OTDOA measurements of one or more cells during a measurement session may be interrupted during IFH. For example, IFHs in LTE can be 'hard' handovers, so that there may be a short interruption in service when the IFH is effected.

Conventionally, upon encountering an IFH or OOS event, UEs may obtain or report: (a) RSTD measurements prior to the event; or (b) RSTD measurements subsequent to the event after resumption of LTE service, and prior to another event or expiry of the OTDOA session; or (c) no RSTD measurements, in situations where an inadequate number of measurements were obtained during periods of LTE service. The exemplary situations outlined above may result in one of: (a) stale RSTD measurements, or (b) fewer RSTD measurements, or (c) no RSTD measurements, thereby detrimentally impacting UE position determination.

In some embodiments disclosed herein, one or more of the following reference time sources may be used to combine OTDOA/RSTD measurements obtained during an OTDOA measurement session, which may have been interrupted by one or more events such as OOS and/or IFH events. In some embodiments, a (A) Global Navigation Satellite System (GNSS) Real Time Clock (RTC) or GNSS system time (e.g. the UE may include and/or be coupled to an GNSS receiver) (B) UE/system clock (e.g. an onboard crystal oscillator); (C) CDMA system time from LTE System Information Block 8 (SIB8) message; or (D) GNSS system time from LTE System Information Block 16 (SIB16) message may be used to combine measurements. In some embodiments, the UE may report the combined measurements in a measurement report. In some embodiments, the measurement report may be submitted: according to a appropriate protocol or relevant standard (e.g. LTE, LPP, LPPe etc); no later than some specified response time; or, upon the expiry of a measurement session (e.g. OTDOA measurement session); or, within some time interval of expiry of the measurement session.

Figure 2B:
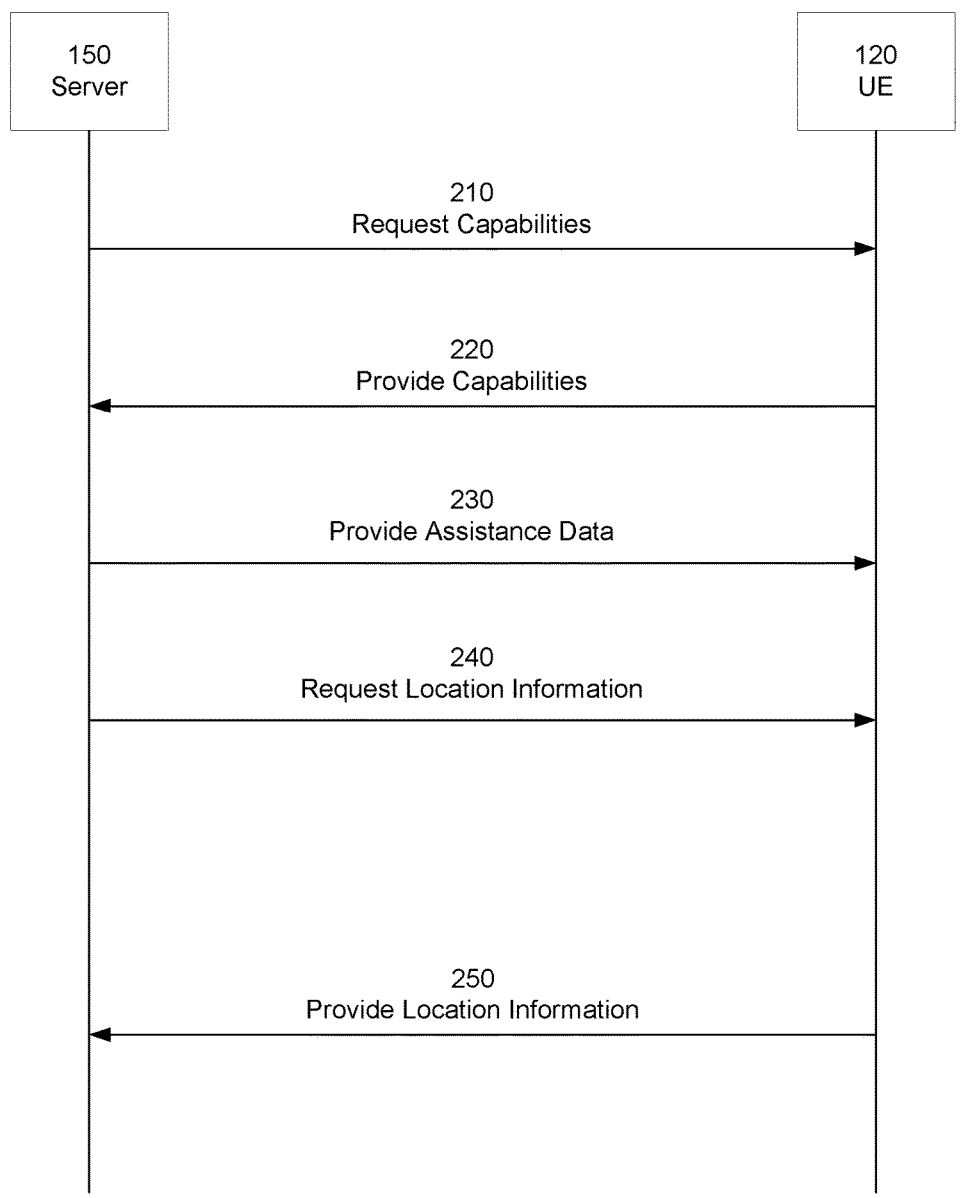
FIG. 2B shows an example flow diagram illustrating message flow 200 between server 150 and UE 120 related to determining the location of UE 120.

FIG. 2B shows an example flow diagram illustrating message flow 200 between server 150 and UE 120 in a system capable of determining the location of UE 120. In some embodiments, the message flow 200 may be initiated in response to a location request (e.g. from LCS Client 160) for the location of UE 120 received by a network entity such as server 150. In some embodiments, server 150 may take the form of a LS, which may assist in UE location determination and/or determine or refine a location or location estimate of UE 120.

In some embodiments, messages exchanged between UE 120 and server 150 may use the LPP, LPPe, or another applicable protocol. The messages exchanged and flows shown in FIG. 2B are illustrative and for explanatory purposes. For example, the message exchanges shown in FIG. 2B may be re-ordered, split-up, combined, and/or rearranged in a manner consistent with disclosed embodiments.

In some embodiments, server 150 may send a Request Capabilities message 210 to UE 120 to determine the capabilities available on UE 120. In some embodiments, Request Capabilities message 210 may also indicate the capabilities desired and/or available on UE 120.

In some embodiments, UE 120 may respond with Provide Capabilities message 220 to server 150. If UE OTDOA related capabilities were requested in Request Capabilities message 210, then Provide Capabilities 220 message may include information elements such as the OTDOA mode supported (e.g. UE-assisted mode or another supported mode), UE supported frequency bands, and UE support for inter-frequency RSTD measurements.

In some embodiments, upon receipt of Provide Capabilities message 220, server 150 may send a Provide Assistance Data message 230 to UE 120. Provide Assistance Data message 230 may include OTDOA assistance data. In some embodiments, the OTDOA assistance data may include assistance data for a reference cell, and assistance data for several neighbor cells. In some embodiments, the assistance data may include cell identifiers and PRS configuration parameters for one or more BS' 140/cells 145. For example, the assistance data may include PRS configuration parameters for the reference cell and PRS configuration parameters for one or more neighbor cells. If UE 120 indicated support for inter-frequency RSTD measurements in Provide Assistance Data message 230, then, in some embodiments, Provide Assistance Data message 230 may include neighbor cell assistance data for one or more frequency layers.

In some embodiments, server 150 may further send Request Location Information message 240 to UE 120. In some embodiments, Request Location Information message 240 may be used to request RSTD measurements by UE 120. For example, during UE assisted mode, UE location determination by server 150 may be based, in part, on RSTD measurements by UE 120. In some embodiments, Request Location Information message 240 may include: information elements such as the type of location information desired; a desired accuracy for any location estimates/ measurements; and/or a response time. In some embodiments, the response time may be set by server 150 or network 130, determined by a protocol used between UE 120 and server 150, and/or by a relevant cellular or other standard.

In some embodiments, UE 120 may perform OTDOA/ RSTD measurements using the provided assistance data (e.g. in Provide Assistance Data message 230) during a measurement session such as an OTDOA measurement session. Further, UE 120 may, within some specified time, provide UE determined RSTD measurements in Provide Location Information message 250 to server 150. Provide Location Information message 250 may include information elements such as one or more of: time stamps of the measurement sets; identity of the reference cell used for calculating the RSTD; a quality metric related to the TOA measurements from the reference cell; a neighbor cell measurement list: identities of measured neighbor cells; RSTD measurements; and/or quality metrics associated with the RSTD measurements.

As outlined above, in some instances UE 120 may encounter one or more IFH or OOS events, which may result in interruptions during a measurement session (e.g. OTDOA measurement session). Accordingly, in some embodiments disclosed herein, a reference time source may be used to combine measurements from before and after each interrupting event.

Figure 3:
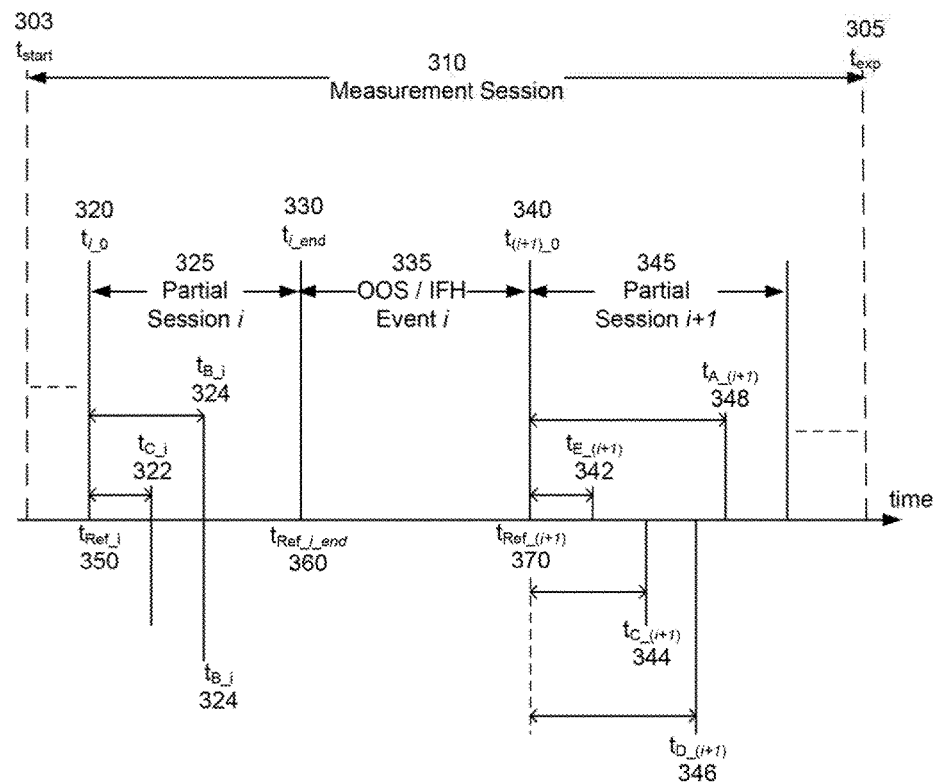
FIG. 3 shows an example timeline illustrating a measurement session 310, interrupted by an OOS/IFH event.

FIG. 3 shows an example timeline illustrating a measurement session 310, interrupted by OOS/IFH event i 335. As shown in FIG. 3, measurement session 310 may start at time $t_{start}$ 303 and end at time $t_{exp}$ 305. FIG. 3 shows measurement session 310 interrupted by OOS/IFH event i 335 resulting in two partial measurement sessions depicted as Partial Session i 325 and Partial Session i+1 345.

In FIG. 3, times of arrival of measured cellular signals (e.g. PRS, CRS, synchronization signals) $t_{C\_i}$ 322, and $t_{B\_i}$ 324 prior to OOS/IFH event i 335 may be measured relative to the start time $t_{i\_0}$ 320 of Partial Session i 325, while times of arrival $t_{E\_(i+1)}$ 342, $t_{C\_(i+1)}$ 344, $t_{D\_(i+1)}$ 346, and $t_{A\_(i+1)}$ 348 subsequent to OOS/IFH event i 335 may be measured relative to the start time $t_{(i+1)\_0}$ 340 of Partial Session i+1 345. The subscripts A, B, C, D, and E refer to the distinct cells/base stations from which the measured signals were received by UE 120.

The term "partial sessions" or "partial measurement sessions" refer to a periods within a single measurement session during which PRS, TOA, and/or other cellular signal parameters were measured, but where the performance of measurements was interrupted because of OOS, IFH, or another event. Because of the above interruptions, a single measurement session (e.g. 310) may have been split into two or more partial measurement sessions (e.g. 325, 345, etc.).

In conventional systems, when measurement session 310 is interrupted, a UE may report either: (a) RSTD measurements based on: TOA $t_{C\_i}$ 322 from a cell C, and TOA $t_{B\_i}$ 324 from a cell B prior to OOS/IFH event i 335; or (b) RSTD measurements based on: TOA $t_{E\_(i+1)}$ 342 from a cell E, TOA $t_{C\_(i+1)}$ 344 from cell C, $t_{D\_(i+1)}$ 346 from a cell D, and $t_{A\_(i+1)}$ 348 from a cell A subsequent to OOS/IFH event i 335; or (c) no RSTD measurements (e.g. if an insufficient an number of measurements was obtained), thereby detrimentally impacting UE position determination.

In some embodiments disclosed herein, one or more reference time sources may be used to time stitch measurements obtained in partial measurement sessions (e.g. Partial Session i 325 and Partial Session i+1 345) and obtain a combined OTDOA/RSTD measurement report. For example, one or more of the following reference time sources may be selected and used to combine OTDOA/ RSTD measurements from partial sessions within a single OTDOA measurement session: (A) Global Navigation Satellite System (GNSS) Real Time Clock (RTC) or GNSS system time (e.g. UE 120 may include and/or be coupled to an GNSS receiver) (B) UE/system clock (e.g. an onboard crystal oscillator on UE 120); (C) CDMA system time from LTE System Information Block 8 (SIB8) message; or (D) GNSS system time from LTE System Information Block 16 (SIB16) message. In some embodiments, UE 120 may listen to, download and store SIB8 and SIB16 when connected to a BS/eNode B (eNB). For example, SIB8 and SIB16 may be obtained and stored prior to or at the start of the measurement session.

In FIG. 3, time measurements based on the reference time source are denoted as $t_{Ref}$ where the subscript "Ref" refers to the reference time source. In some embodiments, when OOS/IFH event 335 is encountered, the start time of OOS/ IFH event 335 based on a selected reference time source may be recorded as $T_{Ref\_i\_end}$ 360 corresponding to $t_{i\_end}$ 330. Further, upon the immediately subsequent resumption of service following OOS/IFH event i 335, the start time of Partial Session i+1 345 based on the selected reference time source may be recorded as $t_{Ref\_(i+1)}$ 370 (or as $t_{Ref\_i}$ 350 for partial session i 325). Because $T_{Ref\_i\_end}$ 360 and $T_{Ref\_(i+1)}$ 370 are known, the duration of OOS/IFH event i 335 is also known. Thus, the times of arrival of signals after OOS/IFH event i 335 (e.g. $t_{E\_(i+1)}$ 342, $t_{C\_(i+1)}$ 344, $t_{D\_(i+1)}$ 346, and $t_{A\_(i+1)}$ 348) may be expressed in terms of times of arrival of one or more signals from before OOS/IFH event i 335 (e.g. $t_{C\_i}$ 322, or $t_{B\_i}$ 324), or vice versa. Accordingly, in some embodiments, a unified or combined RSTD report may be generated by combining measurements from before and after OOS/IFH event i 335. For example, in terms of time measured from the start of Partial Session i 325, the time of arrival of the signal from cell C at $t_{C\_(i+1)}$ 344 may be expressed as:

$$TOA_{C\_(i+1)} = (T_{Ref\_i\_end} - t_{Ref\_i}) + (t_{Ref\_(i+1)} - t_{Ref\_i\_end}) + t_{C\_(i+1)}, \text{ or}$$

$$TOA_{C\_(i+1)} = (t_{Ref\_(i+1)} - t_{Ref\_i}) + T_{C\_(i+1)}$$

Thus, times of arrival of signals during the various partial sessions may be expressed using any appropriate common baseline. In some embodiments, when a time of arrival of a signal is measured, the time of arrival of the signal as measured by a reference time source may also be recorded.

In some embodiments, a partial or intermediate session RSTD measurement report may be generated based on the times of arrival of the signals from cells as measured using the reference time source. In some embodiments, a partial or intermediate RSTD measurement report may be generated relative to a reference cell used or specified for the corresponding partial measurement session. In some embodiments, a unified or combined RSTD measurement report may then be generated at the end of measurement session 310 based on the plurality of partial measurement reports. In some embodiments, generation of the intermediate/partial session measurement reports may facilitate provision, by UE 120, of a partial report for: one of the plurality of partial sessions; and/or a combined report.

In some embodiments, a unified or combined RSTD measurement report may be generated based on TOA measurements from the various partial sessions as measured by the reference time source. The first partial measurement session may start or be viewed as starting at time 0. Thus, in some embodiments, all measured times of arrival, the start times of all interrupting events, and the start times each partial measurement session may be normalized using the reference time source based on the start time of the first partial measurement session.

In FIG. 3, only a single OOS/IFH event i 335 is shown. However, in general, measurement session 310 may include 0 or more partial sessions. If measurement session 310 is a single session, then RSTD measurements from the measurement session may be reported. A single measurement session may result if the measurement session is uninterrupted (no partial sessions), or, if the measurement session expires or times out after an OOS/IFH interruption but before measurements are obtained in a subsequent partial session. If measurement session 310 is interrupted by one or more OOS/IFH events and results in two or more partial sessions, then, in some embodiments, the measurements from the resulting partial sessions may be combined in a manner consistent with disclosed embodiments. For example, the measurements may be combined based on start and end times of the interrupting OOS/IFH events as measured using the selected reference time source.

Figure 4A:
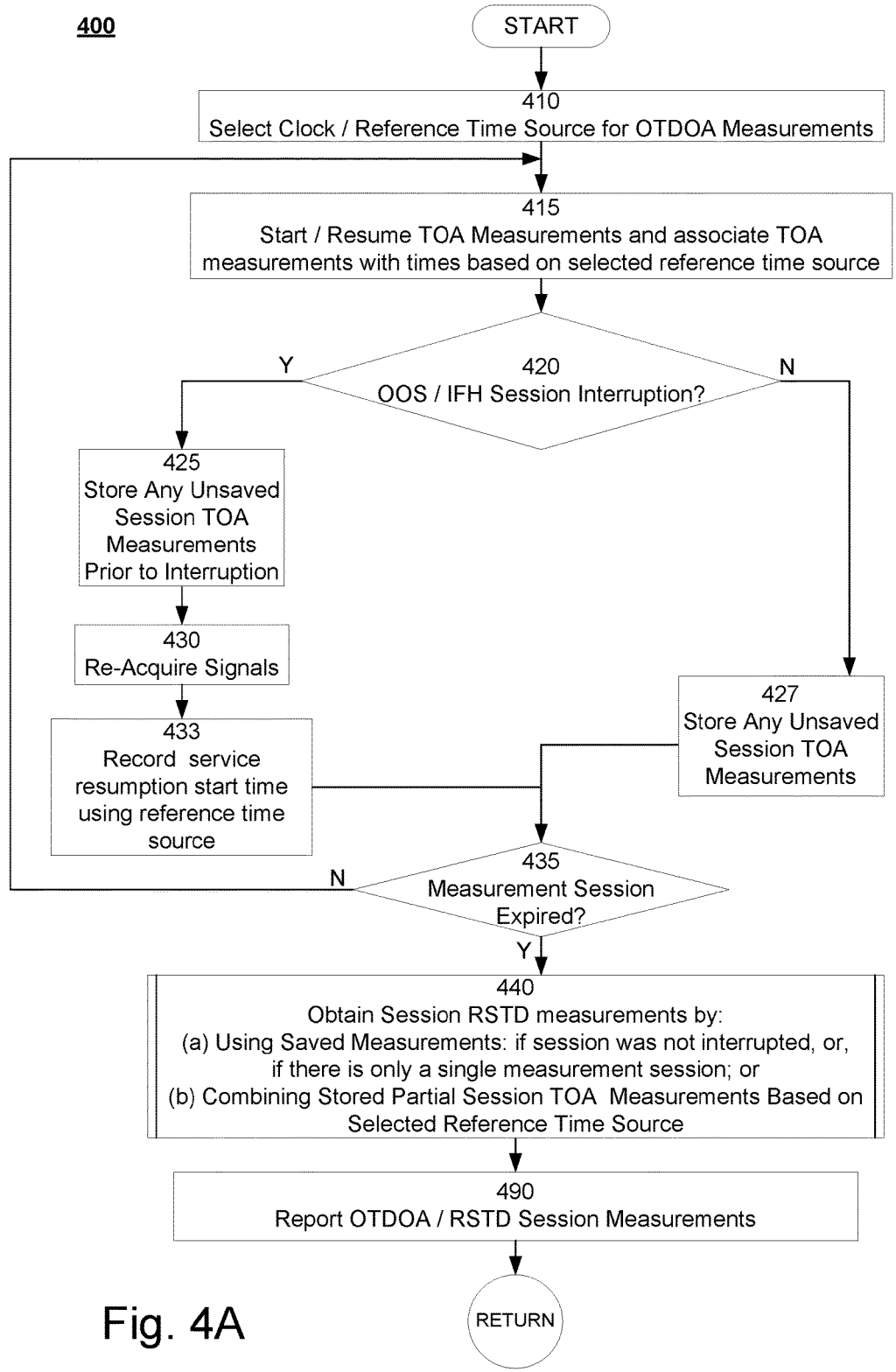
FIG. 4A shows a flowchart illustrating an example method 400 to combine OTDOA/RSTD measurements obtained during an OTDOA measurement session, which may have been interrupted by one or more events.

FIG. 4A shows a flowchart illustrating an example method 400 to combine OTDOA/RSTD measurements obtained during an OTDOA measurement session, which may have been interrupted by one or more events (e.g. OOS/IFH events). In some embodiments, method 400 may be performed on UE 120.

In some embodiments, method 400 may commence when UE 120 initiates a measurement session (e.g. OTDOA session). For example, UE 120 may initiate a measurement session after receiving a Request Location Information message 240 from server 150 or another network entity.

In some embodiments, in block 410, at least one clock or reference time source may be selected and/or used for OTDOA/RSTD measurements. In some embodiments, one or more of the following reference time sources may be selected to obtain OTDOA/RSTD measurements during an OTDOA measurement session: (A) Global Navigation Satellite System (GNSS) Real Time Clock (RTC) or GNSS system time (e.g. UE 120 may include and/or be coupled to an GNSS receiver) (B) UE/system clock (e.g. an onboard crystal oscillator on UE 120); (C) CDMA system time from LTE System Information Block 8 (SIB8) message; or (D) GNSS system time from LTE System Information Block 16 (SIB16) message. In some embodiments, UE 120 may listen to, download and store SIB8 and SIB16 when connected to a BS/eNode B (eNB). For example, SIB8 and SIB16 may be obtained and stored prior to or at the start of the measurement session. In some embodiments, the most accurate available reference time source may be selected. In some embodiments, more than one reference time source may be selected. For example, if a reference time source becomes unavailable during the measurement session, then measurements from partial measurement sessions may be combined using another of the selected reference time sources.

In some embodiments, during the measurement session, UE 120 may measure times of arrival of PRS signals from one or more cells 145/BS' 140. In some embodiments, the TOA and other measurements may be tagged or otherwise associated with a time from one or more of the above reference time sources. In some embodiments, the association may be in addition to any other timestamps used by UE 120 during measurement. In some embodiments, the time of any measurement session interrupting events (such as OOS/IFH events) may be recorded using one or more of the selected reference time sources. In some embodiments, the start time of any partial measurement sessions subsequent to a measurement session interrupting event may be recorded using one or more of the selected reference time sources.

In some embodiments, in block 415, Time Of Arrival (TOA) measurements may be obtained by UE 120 based on signals received from one or more cells or cellular base stations (BS). In some embodiments, the TOA and other parameter measurements may be obtained based on PRS signals transmitted by one or more BS' 140/cells 145. In some embodiments, the TOA and other measurements may be based, in part, on OTDOA assistance data in Provide Assistance Data message 230. In some embodiments, times of arrival of the various signals may be also be measured using the reference time source and stored in a measurement database. The TOA measurements recorded based on the reference time source may augment or be in addition to any conventional method (e.g. offset relative to a SFN of a reference cell, etc.) of recording the measurements. In some embodiments, each TOA measurement may be associated with both a conventional timestamp and timestamp based on the reference time source.

In some embodiments, in block 420, it may be determined whether: (a) the measurement session was interrupted by an OOS or IFH event. If the measurement session was not interrupted ("N" in block 420), then, in block 427, any unsaved OTDOA/RSTD session measurements may be stored. and block 435 may be invoked.

If the measurement session was interrupted ("Y" in block 420), then, in block 425, the partial or intermediate OTDOA/RSTD session measurements prior to the OOS/IFH interruption may be stored. In some embodiments, the start time of the interruption caused by the OOS/IFH event may also be recorded (e.g. in a measurement database) based on the selected reference time source. In some embodiments, each TOA measurement may also be associated with a corresponding reference time measurement and stored.

In some embodiments, in block 425, a partial or intermediate session RSTD measurement report may alternatively or additionally be generated and stored. The partial or intermediate session RSTD measurement report may be generated relative to a reference cell used or specified for the corresponding partial measurement session. In some embodiments, the partial or intermediate session RSTD measurement report may be based on the times of arrival of the signals from cells as measured: (i) conventionally, and (ii) using the reference time source.

Next, in block 430, UE 120 may attempt to reacquire signals for measurements. Upon successful acquisition of signals, in block 433, the start time of the next measurement session may be recorded based on the selected reference time source and block 435 may be invoked. In some embodiments, all measured times of arrival, the start times of all interrupting events, and the start times each partial measurement session may further be normalized and stored based on the start time of the first partial measurement session as measured by the reference time source.

In block 435, it may be determined whether measurement session has expired following signal reacquisition. For example, a timer associated with the measurement session may have expired indicating the end of the measurement session. As one example, the timer associated with the measurement session may be set based on a response time specified by server 150 in Request Location Information message 240 and/or as specified by a protocol or wireless standard used (e.g. LTE, LPP, LPPe etc) by UE 120 and/or between UE 120 and server 150.

In block 435, if it is determined that the measurement session has not expired ("N" in block 435), then, block 415 is invoked and measurements of signals including TOA and other parameters may be resumed.

A measurement session may be interrupted because of OOS or IFH event or because of expiry of the time allocated for the measurement session. Thus, block 420 determines whether the measurement session was interrupted because of an OOS/IFH event, in which case, the measurement session may be resumed, if adequate time is available after signal reacquisition in block 433, while block 435 determines if the time allocated for the measurement session expired, in which case, the measurement session may not be resumed.

In block 435, if it is determined that the measurement session has expired ("Y" in block 435), then, block 440 may be invoked. In block 440, saved measurements may be used to generate an RSTD measurement report, if the measurement session was not interrupted, or if all saved measurements pertain to a single measurement session. On the other hand, if the measurement session was interrupted and resulted in two or more partial measurement sessions, then, a combined RSTD measurement report may be generated. The combined RSTD measurement report may include measurements from before and after any OOS and/or IFH events. In some embodiments, the combining of RSTD measurements may be performed in a manner that is transparent to a server 150 or another network entity to which the measurements may be reported.

In some embodiments, the TOA/RSTD measurements from before and after the OOS/IFH events may be combined, in part, based on stored information pertaining to the start time of each OOS/IFH event, and the start time of each partial measurement session as measured by the reference time source. For example, in one embodiment, at least one of the selected reference time sources may be used to determine the elapsed time between the start of each time of interruption (e.g. OOS/IFH event) and an immediately subsequent time when signals were re-acquired. Relative TOA time measurements in the partial measurement sessions may then be appropriately time stitched to a common baseline. In general, based on the reference time source, various methods of correlating wireless signal measurements from before and after OOS/IFH measurements may be used. The reference time source may be used to time-stitch measurements from before and after each interruption (e.g. OOS/IFH) event based on the at least one selected time reference source. In some embodiments, the combined measurements may be stored or obtained as specified by a protocol, and/or in a format specified by an appropriate information element in Provide Location Information message 250.

Various techniques for combining measurements from partial measurement sessions may be used based on the reference time source as would be apparent to one of skill in the art. For example, as outlined above, in some embodiments, a unified or combined RSTD measurement report may then be generated in block 440 based on partial session RSTD reports. In some embodiments, generation of the intermediate/partial session RSTD reports may facilitate provision, by UE 120, of: (i) a partial report for one of the partial sessions, and/or (ii) a combined report.

Next, in block 490, the combined OTDOA/RSTD measurements may be reported. For example, the combined OTDOA/RSTD measurements may be reported by UE 120 to server 150 in Provide Location Information message 250. In some embodiments, UE 120 may provide the UE determined combined RSTD measurements in Provide Location Information message 250 to server 150, within the specified response time. In some embodiments, Provide Location Information message 250 may include information elements such as one or more of: time stamps of the measurement sets; identity of the reference cell used for calculating the RSTD; a quality metric related to the TOA measurements from the reference cell; a neighbor cell measurement list: identities of measured neighbor cells; RSTD measurements; and/or quality metrics associated with the RSTD measurements. In some embodiments, server 150 or another network entity receiving the combined measurements may be unaware of the OOS/IFH interruptions encountered by UE 120 during the measurement session.

In some embodiments, UE 120 and/or server 150 and/or another network entity may use the combined measurements to determine a location of UE 120.

Figure 4B:
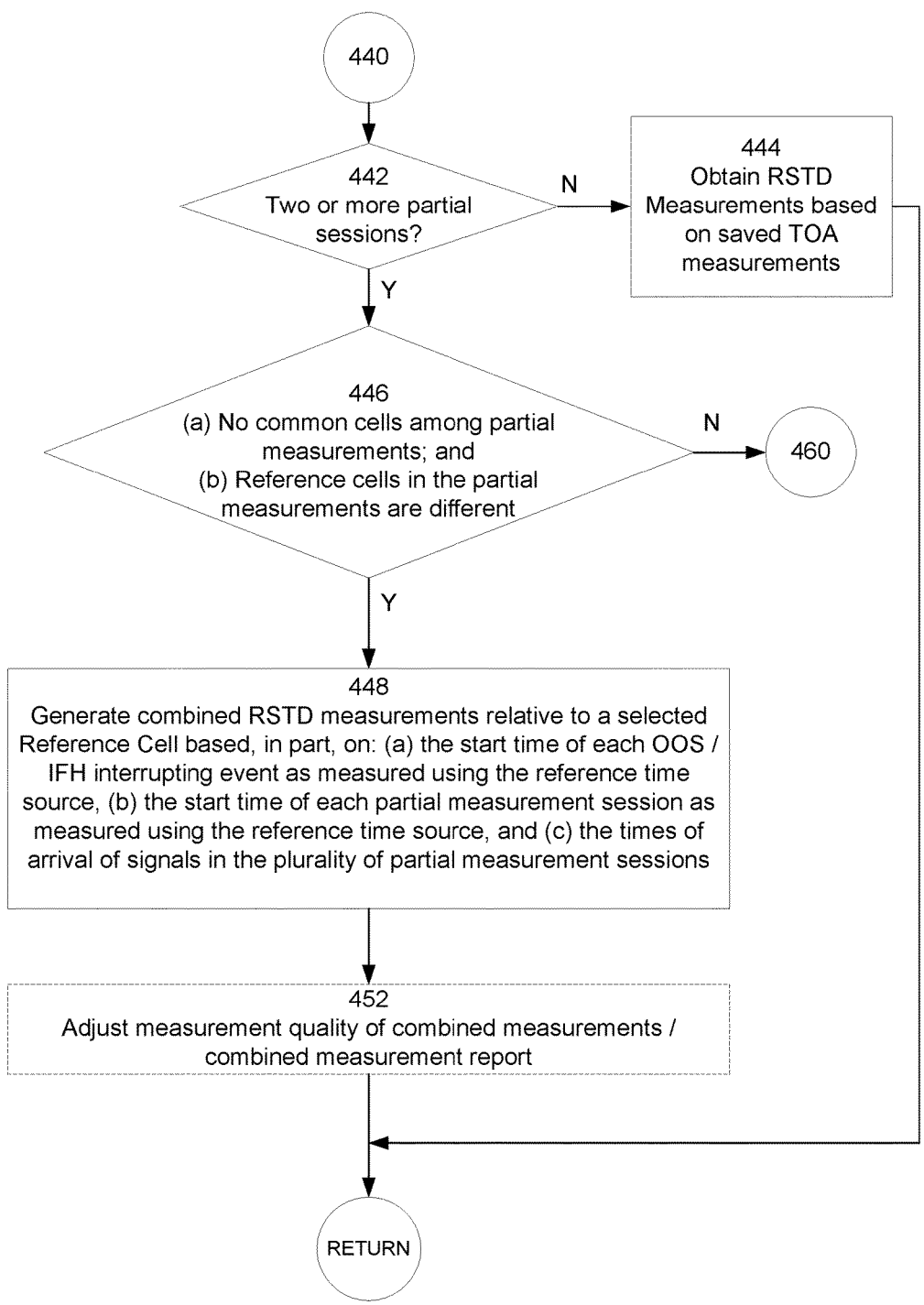
FIG. 4B shows an example flowchart illustrating a portion of block 440 to combine partial OTDOA/RSTD measurements obtained during an interrupted OTDOA measurement session in a situation where there are no common cell measurements from before and after interrupting events.

FIG. 4B shows an example flowchart illustrating a portion of block 440 to combine partial OTDOA/RSTD measurements obtained during an interrupted OTDOA measurement session in a situation where there are no common cell measurements from before and after interrupting events. In block 442, it is determined if there are two or more partial measurement sessions. If there is only one measurement session ("N" in block 442), then, in block 444, RSTD measurements may be obtained based on the saved TOA measurements and control may return to a calling routine/block.

If there are two or more partial measurement sessions ("Y" in block 442), then, in block 446, it is determined if there are: (a) no common cell measurements among the partial measurements; and (b) the reference cells for the partial measurements are different. If the condition specified in block 446 is satisfied ("Y" in block 446), then, in block 448, one of the reference cells in the partial measurement sessions may be selected and a combined RSTD measurement report may be generated relative to the selected Reference Cell based, in part, on the start time of each OOS/IFH interrupting event as measured using the reference time source, the start time of each partial measurement session as measured using the reference time source, and the times of arrival of signals (e.g. PRS signals) in the plurality of partial measurement sessions. In instances where measured times of arrival have been normalized and stored based on the start time of the first partial measurement session as measured by the reference time source, the combined RSTD report may be generated directly based on time differences of the normalized times of arrival.

Table 1A and 1B illustrate how a combined measurement report may be generated based on a selected reference cell for two partial measurement sessions (1) and (2) interrupted by a single OOS/IFH event. In the tables, numeric subscripts refer to the partial measurement session associated with the measurement. The labels/subscripts A, B, C, D, and E refer to distinct base stations/cells.

TABLE 1A

|  | Before OOS$_{(1)}$ | After OOS$_{(2)}$ |
|---|---|---|
| Assistance data list | A, B, C, D, E | A, B, C, D, E |
| TOA measurements (based on reference time source) | $t_{B1}, t_{C1}, t_{D1}$ | $t_{A2}, t_{E2}$ |

For example, Cell B, in Table 1A above, may be selected as the reference cell for the combined report. Further, as illustrated in Table 1B, a combined or unified RSTD report for all valid measured cells relative to the selected reference cell B, may be generated based on the start time (e.g. time $t_{1\_0}=0$) of the first partial measurement session as measured by the selected reference time source. For example, times of arrival may be normalized relative to the start of the first partial measurement session as measured by the reference time source.

TABLE 1B

|  | Unified/Combined RSTD report |
|---|---|
| Reference cell | B |
| Neighbor cell RSTDs | $t_{C1} - t_{B1}$ |
|  | $t_{D1} - t_{B1}$ |
|  | $t_{A2} - t_{B1}$ |
|  | $t_{E2} - t_{B1}$ |

Next, in block 452, the measurement quality associated with the combined measurements may be optionally adjusted and control may return to the calling routine/block. The measurement quality metric may indicate a relative quality of the measurements/combined measurements and may be used to weight measurements when determining a location of UE 120. For example, a higher quality measurement may be weighted higher than a lower quality measurement.

In some embodiments, the measurement quality may be determined based on the sum of time durations of each of the OOS/IFH events $T_I$ relative to the total time duration of the measurement session $T_M$, where $$T_I = \sum_{i=1}^{N} t_{i\_OOS/IFH},$$

where N is the number of OOS/IFH events and $t_{i\_OOS/IFH}$ represents the time duration of each OOS/IFH event. Thus, the measurement quality may be based on $$\frac{T_I}{T_M}.$$

As another example, in some embodiments, the measurement quality may be determined based on the sum of time durations of each of the OOS/IFH events $T_I$ relative to the sum of durations of the partial measurement sessions $T_P$, where $$T_P = \sum_{j=1}^{P} t_{i\_OOS/IFH},$$

where P≥2 and where P is the number of partial measurement sessions and $t_{i\_p}$ represents the time duration of each partial measurement session. Thus, the measurement quality may be based on $$\frac{T_I}{T_P}.$$

As a further example, the measurement quality may be adjusted by multiplying the sum of time durations of each of the OOS/IFH events $T_I$ by some parameter.

In some embodiments, a quality factor $Q_U$ may be associated with an uninterrupted measurement session. When a measurement session is interrupted by one or more OOS/IFH events, then, if the sum of durations of each of the OOS/IFH events is $T_I$, then the measurement quality for the interrupted session may be based on $Q_I = Q_U * g(T_M - T_I)$, where $g(T_M - T_I)$ is a function of $(T_M - T_I)$. The function g may be selected to decrease in value as $T_I$ increases (and $(T_M - T_I)$ decreases) so that more time spent in interruption will result in a lower quality of measurement.

In some embodiments, the measurement quality determined by the above methods may be further adjusted based on the accuracy of the reference time source. The various methods described above of determining a measurement quality may also be used in relation to FIGS. 4C and 4D below.

Figure 4C:
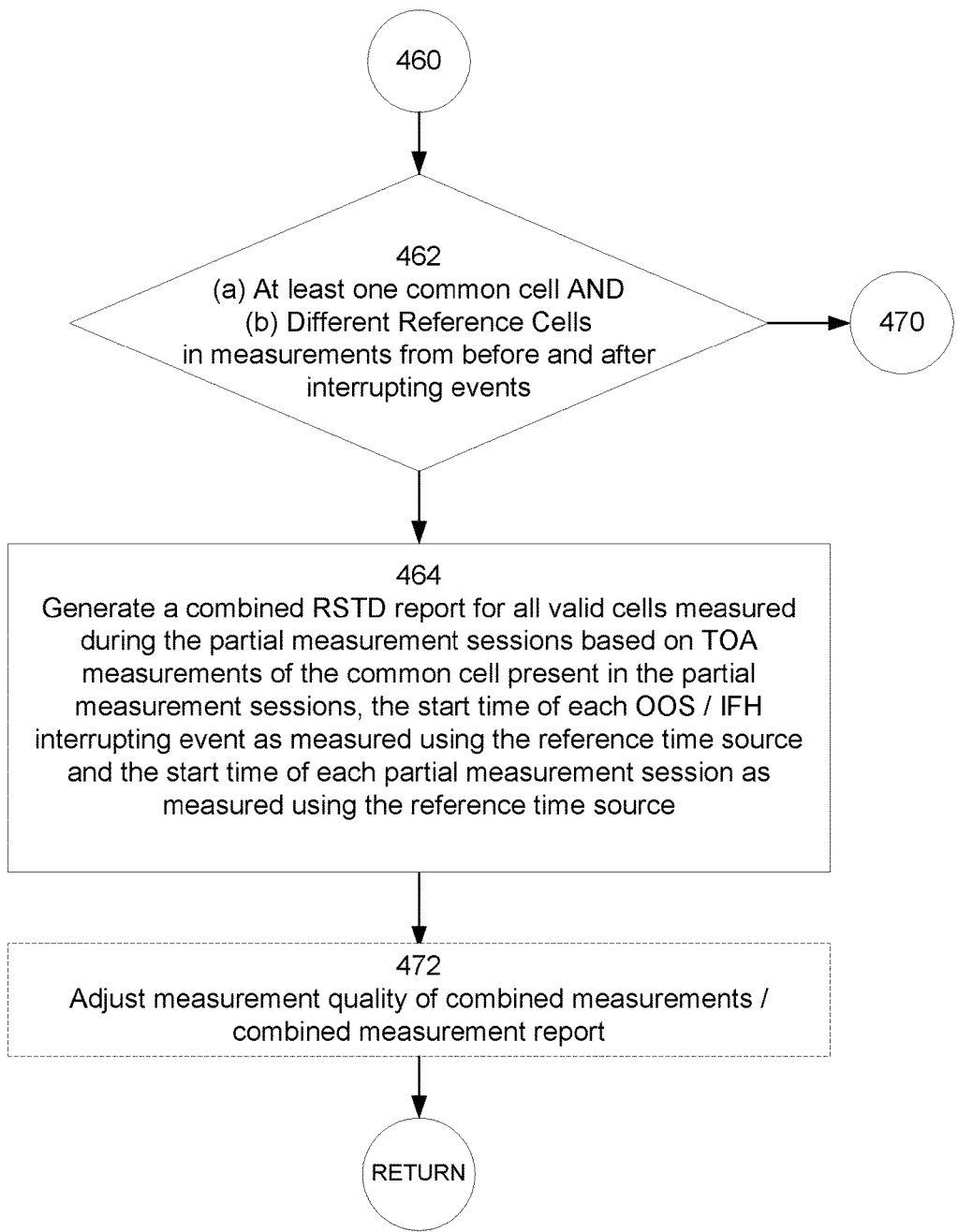
FIG. 4C shows an example flowchart 460 illustrating a portion of block 440 to combine partial OTDOA/RSTD measurements obtained during an interrupted OTDOA measurement session in a situation where there is: (a) at least one common cell, and (b) different reference cells in measurements from before and after interrupting events.

FIG. 4C shows an example flowchart 460 illustrating a portion of block 440 to combine partial OTDOA/RSTD measurements obtained during an interrupted OTDOA measurement session in a situation where there is: (a) at least one common cell, and (b) different reference cells in measurements from before and after interrupting events.

In block 462, it is determined if there is: (a) at least one common cell, and (b) different reference cells in measurements from before and after interrupting events. If the condition specified in block 462 is satisfied ("Y" in block 462), then, in block 464, a combined RSTD report may be generated for all valid cells measured during the partial measurement sessions based on TOA measurements of the common cell present in the partial measurement sessions, the start time of each OOS/IFH interrupting event as measured using the reference time source and the start time of each partial measurement session as measured using the reference time source.

Table 2A and 2B illustrate how a combined measurement report may be generated based on a common measured cell for two partial measurement sessions (1) and (2) interrupted by a single OOS/IFH event. In Tables 2A and 2B the numeric subscripts indicate the partial measurement session associated with the measurement. The subscripts/labels A, B, C, D, and E may refer to distinct base stations/cells.

TABLE 2A

|  | Before OOS$_{(1)}$ | After OOS$_{(2)}$ |
|---|---|---|
| Assistance data list | A, B, C, D, E | A, B, C, D, E |
| TOA measurements (based on reference time source) | $t_{B1}, t_{C1}$ | $t_{A2}, t_{C2}, t_{D2}, t_{E2}$ |

In Table 2A above, Cell C is common to partial measurement session (1) (before) and partial measurement session (2) (after) the OOS/IFH interrupting event.

TABLE 2B

|  | Partial Session Report Before Interrupting Event | Unified/Combined RSTD report |
|---|---|---|
| Reference cell | B | A |
| Neighbor cell RSTDs | $t_{C1} - t_{B1}$ | $(t_{C2} - t_{A2}) - (t_{C1} - t_{B1})$<br>$t_{C2} - t_{A2}$<br>$t_{D2} - t_{A2}$<br>$t_{E2} - t_{A2}$ |

In Table 2B, RSTD measurements for reference cell B in the partial session prior to the interrupting event are used to obtain RSTD measurements for cell B relative to reference cell A subsequent to the interrupting event. The term $(t_{C2} - t_{A2}) - (t_{C1} - t_{B1})$ represents the RSTD measurement of Cell B relative to reference Cell A. Because the RSTD measurements of Cell B relative to reference Cell A are known, the RSTD measurements for any cell relative to reference Cell A subsequent to the interrupting event may be obtained from RSTD measurements for that cell relative to reference cell B prior to the interrupting event.

In some embodiments, alternatively and/or additionally, the start time of the first measurement session as measured by the selected reference time source may be set to zero (e.g. time $t_{1\_0}=0$) to represent the start of the first partial measurement session. Further, a combined or unified RSTD report for all valid measured cells relative to reference cell A, may be generated based on the times of arrival of the signals as measured by the reference time source.

Next, in block 452, the measurement quality associated with the combined measurements may be optionally determined as outlined above (e.g. with respect to FIG. 4B) and control may return to the calling routine/block.

Figure 4D:
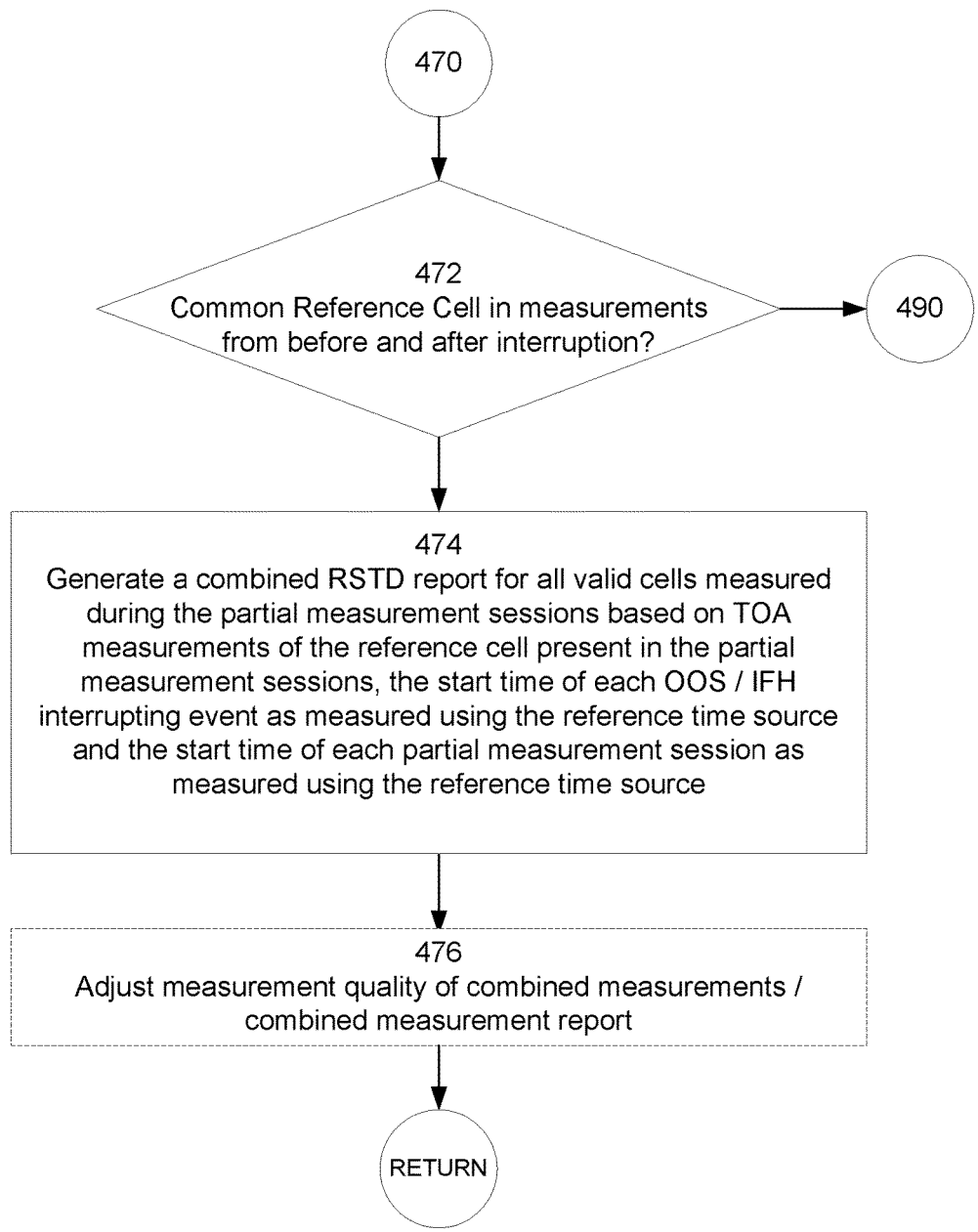
FIG. 4D shows an example flowchart 470 illustrating a portion of block 440 to combine partial OTDOA/RSTD measurements obtained during an interrupted OTDOA measurement session in a situation where there is at least one common reference cell from before and after interrupting events.

FIG. 4D shows an example flowchart 470 illustrating a portion of block 440 to combine partial OTDOA/RSTD measurements obtained during an interrupted OTDOA measurement session in a situation where there is at least one common reference cell from before and after interrupting events.

In block 472, it is determined if there is there is at least one common reference cell from before and after interrupting events. If there is at least one common reference cell from before and after interrupting events ("Y" in block 462), then, in block 474, a combined RSTD report may be generated for all valid cells measured during the partial measurement sessions based on TOA measurements of the common reference cell present in the partial measurement sessions, the start time of each OOS/IFH interrupting event as measured using the reference time source and the start time of each partial measurement session as measured using the reference time source.

Table 3A and 3B illustrate how a combined measurement report may be generated based on the common reference cell for two partial measurement sessions (1) and (2) interrupted by a single OOS/IFH interruption event. In Tables 3A and 3B the numeric subscripts indicate the partial measurement session associated with the measurement. The labels/subscripts A, B, C, D, and E refer to distinct base stations/cells.

TABLE 3A

|  | Before $OOS_{(1)}$ | After $OOS_{(2)}$ |
|---|---|---|
| Assistance data list | A, B, C, D, E | A, B, C, D, E |
| TOA measurements | $t_{A1}, t_{B1}, t_{C1}$ | $t_{A2}, t_{B2}, t_{D2}, t_{E2}$ |

In Table 3A above, Cell A is the common reference cell in partial measurement sessions (1) (before) and (2) (after) the OOS/IFH interrupting event. Further, as illustrated in Table 3B, a combined or unified RSTD report for all valid measured cells relative to common reference cell A, may be generated based on the start time of the first measurement session as measured by the selected reference time source. For example, times of arrival may be normalized relative to the start of the first partial measurement session (e.g. time $t_{1\_0}=0$) as measured by the reference time source.

TABLE 3B

|  | Partial Session Report Before Interrupting Event | Unified/Combined RSTD report |
|---|---|---|
| Reference cell | B | A |
| Neighbor cell RSTDs | $t_{B1} - t_{A1}$<br>$t_{C1} - t_{A1}$ | $t_{B2} - t_{A2}$<br>$t_{C1} - t_{A1}$<br>$t_{D2} - t_{A2}$<br>$t_{E2} - t_{A2}$ |

Next, in block 452, the measurement quality associated with the combined measurements may be optionally determined as outlined above (e.g. with respect to FIG. 4B) and control may return to the calling routine/block.

Figure 5:
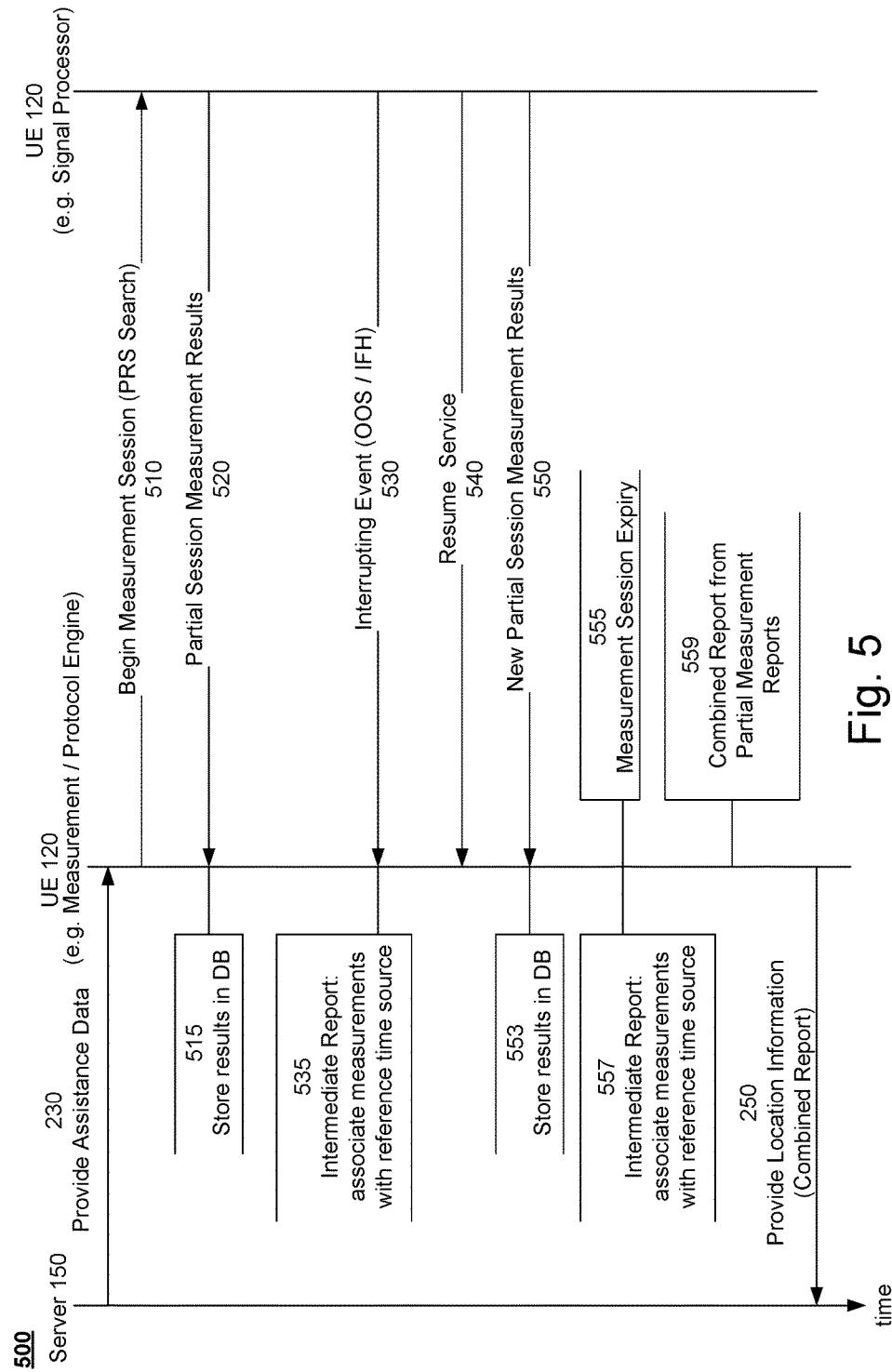
FIG. 5 shows a flow diagram 500 illustrating some events, actions, and messages exchanged between UE 120 and server 150 in a system capable of determining the location of UE 120.

FIG. 5 shows a flow diagram 500 illustrating some events, actions, and messages exchanged between UE 120 and server 150 in a system 175 capable of determining the location of UE 120.

In FIG. 5, some events are shown split across UE 120 merely to illustrate the functions performed by UE 120. For example, the messages shown as being exchanged between the two lines representing UE 120 may be performed transparently and entirely within UE 120. In some instances, the messages may be exchanged, for example, between functional components or processors within UE 120.

For example, FIG. 5 shows that messages may be exchanged between server 150 and a measurement/protocol engine on UE 120. In some embodiments, the measurement protocol engine may store partial measurement session results, associate and record measurements based on a selected reference time source and provide the combined measurements to server 150 (e.g. an LS).

Further, FIG. 5 shows that measurement/protocol engine on UE 120 may communicate with a signal processor on UE 120 to receive measured signal parameters, messages relating to interruption events such as OOS/IFH events, and messages indicating resumption of service. In some embodiments, both measurement/protocol engine and signal processor component may form part of a processor on UE 120 and/or may be implemented by some combination of hardware, software and firmware.

In some embodiments, server 150 may send a Provide Assistance Data message 230 to UE 120. Provide Assistance Data message 230 may include OTDOA assistance data such as PRS parameters for a reference cell and one or more neighboring cells. In some embodiments, the OTDOA assistance data may include assistance data for a reference cell, and assistance data for several neighbor cells. In some embodiments, Provide Assistance Data message 230 may include neighbor cell assistance data for one or more frequency layers. In some embodiments, server 150 may further send Request Location Information message 240 to UE 120 (not shown in FIG. 5) to request TOA/RSTD measurements.

Upon receipt of Provide Assistance Data message 230, UE 120 may start PRS search for signals from one or more cells. For example, measurement/protocol engine on UE 120 may communicate with a signal processor on UE 120 to initiate a measurement session 510, and search for PRS signal from one or more cells based on the OTDOA assistance data in Provide Assistance Data message 230. In some embodiments, at least one reference time source may be selected prior to initiation of measurement session 510.

In some embodiments, partial measurement results may be continuously or periodically received by measurement/protocol engine on UE 120 from signal processor on UE 120. In some embodiments, measurement/protocol engine on UE 120 may store the partial measurement results in a measurement database. In some embodiments, the times of arrival of the PRS signals may be stored conventionally, and may also be associated with timestamps based on the selected reference time source.

In some embodiments, upon receipt of interrupting event message 530 from signal processor on UE 120 indicating an interrupting event (e.g. OOS or IFH event), measurement/protocol engine on UE 120 may generate an intermediate or partial session measurement report 535.

In some embodiments, the partial or intermediate session RSTD measurement report may be based on the times of arrival of the signals from cells as measured using the reference time source. Further, the partial or intermediate session RSTD measurement report may be generated relative to a reference cell used or specified for the corresponding partial measurement session.

In some embodiments, partial session measurement report 535 may (additionally or alternatively) associate partial session measurements such as times of arrival of signals received prior to the interrupting event with times measured by a reference time source. The intermediate/partial session measurement report 535 may also store the time of start of the interrupting event as measured by the reference time source in the measurement database.

In some embodiments, measurement/protocol engine on UE 120 may receive Resume Service message 540 indicating that signals have been reacquired following the interrupting event. In some embodiments, measurement/protocol engine on UE 120 may record the start time of the next partial measurement session in measurement database based on the reference time source. In some embodiments, following Resume Service message 540, measurement/protocol engine on UE 120 may receive new partial measurement results 550 from signal processor on UE 120. In some embodiments, measurement/protocol engine on UE 120 may store the received new partial measurement results 550 in a measurement database.

Further, at some point during the process, a timer may signal measurement session expiry 555. Upon receiving an indication of measurement session expiry 555, measurement/protocol engine on UE 120 may generate a new intermediate/partial measurement session report 557 with RSTD measurements obtained subsequent to resumption of service 540 and prior to measurement session expiry 555. In some embodiments, new intermediate/partial measurement session report 557 may also associate the start time of the new partial measurement session and the times of arrival of measured signal with the reference time source.

Subsequently, measurement/protocol engine on UE 120 may generate combined report 559 combining measurements from partial measurement reports 535 and 557. Various techniques for combining measurements from partial measurement sessions may be used based on the reference time source as would be apparent to one of skill in the art. For example, as outlined above, in some embodiments, a unified or combined RSTD measurement report 559 may then be generated based on the partial session RSTD reports. In some embodiments, generation of the intermediate/partial session reports may facilitate provision, by UE 120, of a partial RSTD report for one of the partial sessions, and/or a combined RSTD report.

In some embodiments. combined report 559 may (alternatively or additionally) include RSTD/OTDOA and/or other parameter measurements relative to a reference cell. In some embodiments, combined report 559 may be generated based in part on the start time of each interrupting event, the start time of each partial measurement session, and the times of arrival of measured signals as measured by the reference time source. In some embodiments, combined report 559 may be provided to server 150 by UE 120 in a Provide Location Information message 250.

Figure 6:
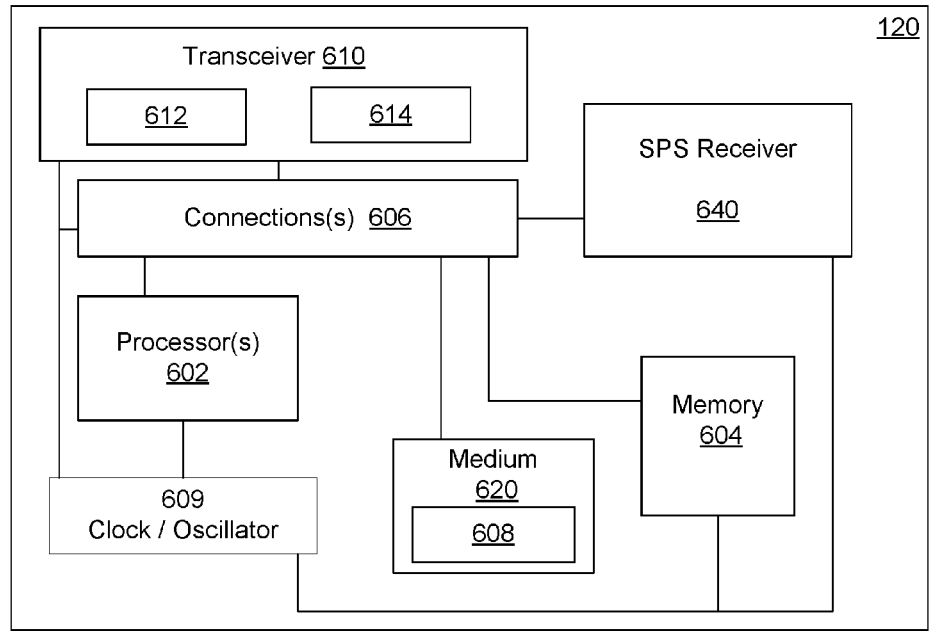
FIG. 6 shows a schematic block diagram illustrating certain exemplary features of UE 120 enabled to support location determination.

FIG. 6 shows a schematic block diagram illustrating certain exemplary features of UE 120 enabled to support OTDOA measurement using OTDOA assistance information for non-serving cells in a manner consistent with disclosed embodiments. UE 120 may, for example, include one or more processor(s) 602, memory 604, a transceiver 610 (e.g., wireless network interface), and (as applicable) an SPS receiver 640, which may be operatively coupled with one or more connections 606 (e.g., buses, lines, fibers, links, etc.) to non-transitory computer-readable medium 620 and memory 604. In certain example implementations, all or part of UE 120 may take the form of a chipset, and/or the like. The SPS receiver 640 may be enabled to receive signals associated with one or more SPS resources. Transceiver 610 may, for example, include a transmitter 612 enabled to transmit one or more signals over one or more types of wireless communication networks and a receiver 614 to receive one or more signals transmitted over the one or more types of wireless communication networks.

In some embodiments, SPS receiver may include or be coupled to a Global Navigation Satellite System (GNSS) Real Time Clock (RTC) and/or receive GNSS system time, which may serve as reference time source for signal measurements. In some embodiments, processor(s) 602, transceiver 610, and other components on UE 120 may also be coupled to clock/oscillator 609, which may serve as a time reference source for signal measurements. In some embodiments, transceiver 610/processor(s) 602 may receive CDMA system time from LTE System Information Block 8 (SIB8) message; or GNSS system time from LTE System Information Block 16 (SIB16), which may also serve as reference time sources.

Processor(s) 602 may be implemented using a combination of hardware, firmware, and software. In some embodiments, processor(s) 602 may include an OTDOA Assistance Data component, which may process received OTDOA assistance information. In some embodiments, processor(s) 602 may perform some or all of message flow 200, method 400, and message flow 500. For example, processor(s) 602 may process OTDOA assistance information comprising Reference Cell Information, SFN-Offset information related to a serving cell and a reference cell, neighbor cell information, etc. In some embodiments, processor(s) 602 may include measurement/protocol engine and/or a signal processor. In some embodiments, processor(s) 602 and/or OTDOA Assistance Data component, measurement/protocol engine, and signal processor in processor(s) 602 may represent one or more circuits configurable to perform at least a portion of a computing procedure or process related to the operation of UE 120.

In some embodiments, UE 120 may include one or more MS antennas (not shown) which may be internal or external. MS antennas may be used to transmit and/or receive signals processed by transceiver 610 and/or SPS receiver 640. In some embodiments, MS antennas may be coupled to transceiver 610 and SPS receiver 640. In some embodiments, measurements of signals received (transmitted) by UE 120 may be performed at the point of connection of the MS antennas and transceiver 610. For example, the measurement point of reference for received (transmitted) RF signal measurements may be an input (output) terminal of the receiver 614 (transmitter 612) and an output (input) terminal of the MS antennas. In an UE 120 with multiple MS antennas or antenna arrays, the antenna connector may be viewed as a virtual point representing the aggregate output (input) of multiple MS antennas. In some embodiments, UE 120 may measure received signals including signal strength and TOA measurements and the raw measurements may be processed by processor(s) 602. In some embodiments, the received measurements—raw and processed may be time-stamped, associated with times measured by a reference time source, and stored in a measurement database. In some embodiments, memory 604 may include some or all of measurement database.

The methodologies described herein may be implemented by various means depending upon the application. For example, these methodologies may be implemented in hardware, firmware, software, or any combination thereof. For a hardware implementation, the processor(s) 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using microcode, routines, procedures, functions, and so on that perform the functions described herein. Any machine-readable medium tangibly embodying instructions may be used in implementing the methodologies described herein. For example, software codes may be stored in a non-transitory computer-readable medium 620 or memory 604 that is connected to and executed by processor(s) 602. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer-readable medium, such as medium 620 and/or memory 604. Examples include computer-readable media encoded with a data structure and computer-readable media encoded with a computer program 608. For example, the non-transitory computer-readable medium including program code 608 stored thereon may include program code 608 to support OTDOA measurement using OTDOA assistance information, associating TOA and other measured signal parameters with reference time sources, storing and combining partial measurement reports, and performing other functions, including support for any communication/location determination protocols.

Non-transitory computer-readable media 620 includes physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other non-transitory medium that can be used to store desired program code 608 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 620, in some instances, instructions and/or data may be provided as signals on a transmission channel included in a communication apparatus. For example, a communication apparatus may include a transceiver 610 receiving signals indicative of instructions and data. The instructions and data may be configured to cause one or more processors to implement the functions outlined in the claims. That is, the communication apparatus may include transmission channels with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from processor(s) 602, it should be understood that all or part of a primary memory may be provided within or otherwise co-located/coupled with processor(s) 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 620. As such, in certain example implementations, the methods and/or apparatuses presented herein may take the form in whole or part of a computer-readable medium 620 that may include computer implementable instructions 608 stored thereon, which if executed by at least one processor(s) 602 may be operatively enabled to perform all or portions of the example operations as described herein. Computer readable medium 620 may be a part of memory 604.

Figure 7:
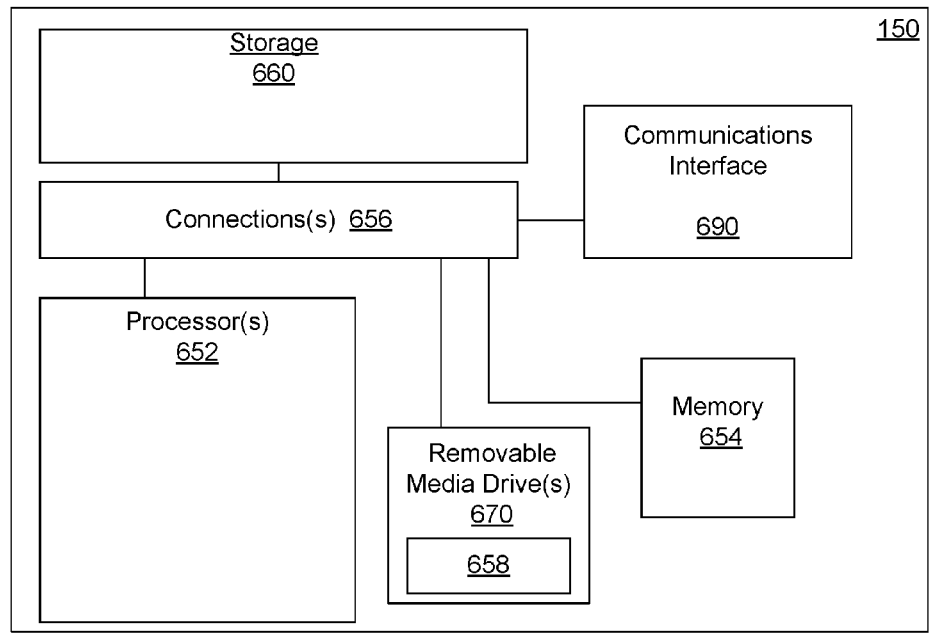
FIG. 7 shows a schematic block diagram illustrating a server enabled to support location services for a UE.

Reference is now made to FIG. 7, which is a schematic block diagram illustrating a server 150 enabled to support OTDOA measurement using OTDOA assistance information for non-serving cells in a manner consistent with disclosed embodiments. In some embodiments, server 150 may perform functions of a location server and/or a E-SMLC. In some embodiments, server 150 may include, for example, one or more processor(s) 652, memory 654, storage 660, and (as applicable) communications interface 690 (e.g., wireline or wireless network interface), which may be operatively coupled with one or more connections 656 (e.g., buses, lines, fibers, links, etc.). In certain example implementations, some portion of server 150 may take the form of a chipset, and/or the like.

Communications interface 690 may include a variety of wired and wireless connections that support wired transmission and/or reception and, if desired, may additionally or alternatively support transmission and reception of one or more signals over one or more types of wireless communication networks. Communications interface 690 may also include interfaces for communication with various other computers and peripherals. For example, in one embodiment, Communications interface 690 may comprise network interface cards, input-output cards, chips and/or ASICs that implement one or more of the communication functions performed by server 150. In some embodiments, communications interface 690 may also interface with network 130 to obtain a variety of network configuration related information, such as PCIs, configured PRS information, and/or timing information used by the base stations in the network. For example, Communications interface 690 may make use of the LPP/LPP annex (LPPa) protocol defined in 3GPP TS 36.455 or a modification of this protocol to obtain PCI, configured PRS, timing and/or other information from the base stations in network 130. Processor(s) 652 may use some or all of the received information to generate OTDOA assistance data information in a manner consistent with disclosed embodiments.

Processor(s) 652 may be implemented using a combination of hardware, firmware, and software. In some embodiments, processor(s) 652 may generate OTDOA assistance information, compute the location of UE 120 based on OTDOA measurements performed by UE 120, process combined measurement reports received from UE 120 and/or another network entity, etc. In some embodiments, processor(s) 652 may generate the OTDOA assistance information as Long Term Evolution (LTE) Positioning Protocol (LPP) or LPP extensions (LPPe) messages. In some embodiments, processor(s) 652 may represent one or more circuits configurable to perform at least a portion of a data signal computing procedure or process related to the operation of server 150.

The methodologies described herein in flow charts and message flows may be implemented by various means depending upon the application. For example, these methodologies may be implemented in hardware, firmware, software, or any combination thereof. For a hardware implementation, the processor(s) 652 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with microcode, procedures, functions, and so on that perform the functions described herein. Any machine-readable medium tangibly embodying instructions may be used in implementing the methodologies described herein. For example, software may be stored in removable media drive 670, which may support the use of non-transitory computer-readable media 658, including removable media. Program code may be resident on non-transitory computer readable media 658 or memory 654 and may be read and executed by processor(s)s 652. Memory may be implemented within processor(s) 652 or external to processor(s) 652. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 658 and/or memory 654. Examples include computer-readable media encoded with a data structure and computer-readable media encoded with a computer program. For example, non-transitory computer-readable medium 658 including program code stored thereon may include program code to support OTDOA measurement using OTDOA assistance information in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission channels to communications interface 690, which may store the instructions/data in memory 654, storage 660 and/or relay the instructions/data to processor(s) 652 for execution. For example, communications interface 690 may receive wireless or network signals indicative of instructions and data. The instructions and data are configured to cause one or more processors to implement the functions outlined in the claims. That is, the communication apparatus includes transmission channels capable of receiving signals indicative of information to perform disclosed functions.

Memory 654 may represent any data storage mechanism. Memory 654 may include, for example, a primary memory and/or a secondary memory. Primary memory may include, for example, a random access memory, read only memory, nonvolatile RAM, etc. While illustrated in this example as being separate from processor(s) 652, it should be understood that all or part of a primary memory may be provided within or otherwise co-located/coupled with processor(s) 652. Secondary memory may include, for example, the same or similar type of memory as primary memory and/or storage 660 such as one or more data storage devices 660 including, for example, hard disk drives, optical disc drives, tape drives, a solid state memory drive, etc. In some embodiments, storage 660 may comprise one or more databases that may hold information pertaining to various entities in system 100 and/or the broader cellular network. In some embodiments, information in the databases may be read, used and/or updated by processor(s) 652 during various computations, including storing capabilities of UE 120, capabilities of server 150, generating OTDOA assistance data, computing a location of UE 120, etc.

In certain implementations, secondary memory may be operatively receptive of, or otherwise configurable to couple to a non-transitory computer-readable medium 658. As such, in certain example implementations, the methods and/or apparatuses presented herein may take the form in whole or part of a removable media drive 670 that may include non-transitory computer readable medium 658 with computer implementable instructions stored thereon, which if executed by at least one processor(s) 652 may be operatively enabled to perform all or portions of the example operations as described herein. Computer readable medium 658 may be a part of memory 654.

Figure 8:
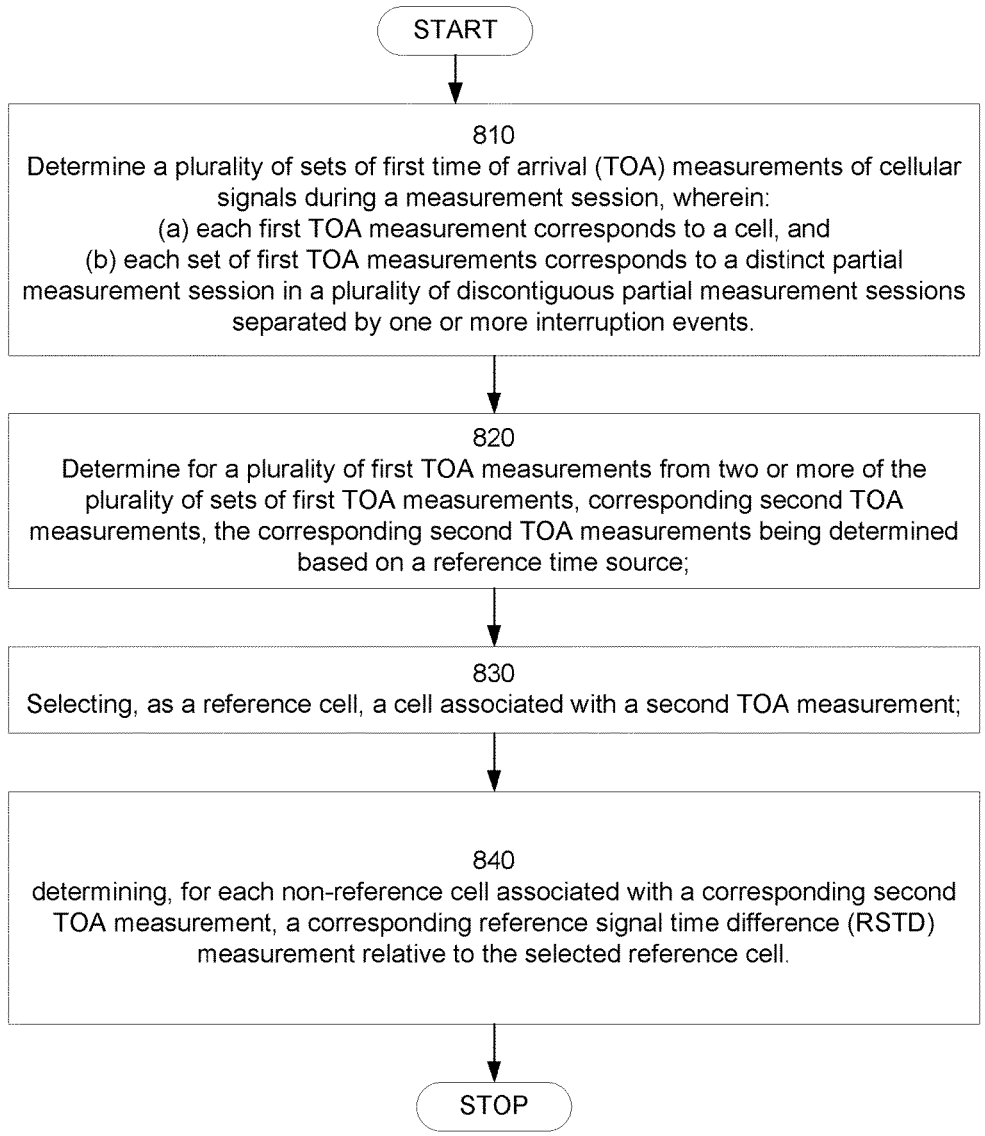
FIG. 8 shows a flowchart illustrating an example method 800 to combine RSTD measurements obtained during an OTDOA measurement session, which may have been interrupted by one or more events (e.g. OOS/IFH events).

FIG. 8 shows a flowchart illustrating an example method 800 to combine RSTD measurements obtained during an OTDOA measurement session, which may have been interrupted by one or more events (e.g. OOS/IFH events). In some embodiments, method 800 may be performed on UE 120.

In some embodiments, method 800 may commence when UE 120 initiates a measurement session (e.g. OTDOA session). For example, UE 120 may initiate a measurement session after receiving a Request Location Information message 240 from server 150 or another network entity.

In block 810, a plurality of sets of first time of arrival (TOA) measurements of cellular signals during a measurement session may be determined, where: (a) each first TOA measurement may correspond to a cell, and (b) each of the sets of first TOA measurements may correspond to a distinct partial measurement session in a plurality of discontiguous partial measurement sessions, which may be separated by one or more interruption events. The interruption events may comprise at least one of: an Out Of Service (OOS) event; or an Inter-Frequency Handover (IFH) event. The measured cellular signals may comprise Long Term Evolution (LTE) Positioning Reference Signals (PRS).

In block 820, second TOA measurements corresponding to a plurality of first TOA measurements from two or more of the sets of first TOA measurements may be determined. The corresponding second TOA measurements may be determined based on at least one reference time source. Each second TOA measurement may correspond to one of the plurality of first TOA measurements.

In some embodiments, for each of the first plurality of TOA measurements, the corresponding second TOA measurement may be determined based on one of the reference time sources by: determining a start time of each of the one or more interruption events based on the reference time source. Further, a start time of each of the plurality of partial measurement sessions may be determined based on the reference time source. The corresponding second TOA measurement may then be determined, based, in part, on: (a) the start time of each interruption event that occurs prior to the corresponding first TOA measurement, and (b) the start time of each partial measurement session that occurs prior to the corresponding first TOA measurement.

In some embodiments, the reference time source may comprise at least one of: (i) a Global Navigation Satellite System (GNSS) Real Time Clock (RTC); or (ii) a GNSS system time from a Satellite Positioning System (SPS) Receiver coupled to the UE; or (iii) a clock or oscillator on the UE; or (iv) CDMA system time derived from a Long Term Evolution (LTE) System Information Block 8 (SIB8) message received by the UE prior to the interruption events; or (v) GNSS system time derived from an LTE System Information Block 16 (SIB16) message received by the UE prior to the interruption events.

In block 830, a cell associated with a second TOA measurement may be selected as a reference cell. In some embodiments, a common reference cell used by at least two partial measurement sessions associated with two or more sets of first TOA measurements may be selected as the reference cell.

In block 840, for each non-reference cell that is associated with a corresponding second TOA measurement, a corresponding reference signal time difference (RSTD) measurement relative to the selected reference cell may be determined. The RSTD measurement for a non-reference cell may be determined based, in part, on the second TOA measurement of the selected reference cell.

In some embodiments, method 800 may further comprise: determining a quality metric associated with the RSTD measurements for the non-reference cells, wherein the quality metric is based, in part, on a time duration associated with each of the one or more interruption events. For example, the quality metric may be determined and utilized as outlined above.

In some embodiments, method 800 may further comprise: reporting the corresponding RSTD measurements to a location server. Further, a location of UE 120, based, in part on the reported RSTD measurements may be received by UE 120.

In some embodiments, method 800 may further comprise: determining a location of the UE based, in part on the corresponding RSTD measurements.

Although the present disclosure is described in connection with specific embodiments for instructional purposes, the disclosure is not limited thereto. Various adaptations and modifications may be made to the disclosure without departing from the scope. Therefore, the spirit and scope of the appended claims should not be limited to die foregoing description.

What is claimed is:

1. A method on a User Equipment (UE) comprising:
   determining a plurality of sets of first time of arrival (TOA) measurements of cellular signals during a first measurement session, wherein:
   each first TOA measurement corresponds to a cell, and
   each set of first TOA measurements corresponds to a distinct partial measurement session in a plurality of discontiguous partial measurement sessions caused by one or more interruption events interrupting the first measurement session;
   determining, for a plurality of first TOA measurements from two or more of the plurality of sets of first TOA measurements, corresponding second TOA measurements, the corresponding second TOA measurements being determined based on a reference time source;
   selecting, as a reference cell, a cell associated with a second TOA measurement; and
   determining, for each non-reference cell associated with a corresponding second TOA measurement, a corresponding reference signal time difference (RSTD) measurement relative to the selected reference cell.

2. The method of claim 1, wherein the one or more interruption events comprise at least one of:
   an Out Of Service (OOS) event; or
   an Inter-Frequency Handover (IFH) event.

3. The method of claim 1, wherein the reference time source comprises at least one of:
   a Global Navigation Satellite System (GNSS) Real Time Clock (RTC); or a GNSS system time from a Satellite Positioning System (SPS) Receiver coupled to the UE; or a clock or oscillator on the UE; or CDMA system time derived from a Long Term Evolution (LTE) System Information Block 8 (SIB8) message received by the UE prior to the interruption events; or GNSS system time derived from an LTE System Information Block 16 (SIB16) message received by the UE prior to the interruption events.

4. The method of claim 1, wherein determining, for each corresponding second TOA measurement, the corresponding RSTD measurement comprises:

determining the corresponding RSTD measurement based on the corresponding second TOA measurement of the selected reference cell.

5. The method of claim 1, wherein selecting the reference cell comprises:

selecting a common reference cell used by at least two partial measurement sessions, the at least two partial measurement sessions associated with two or more sets of first TOA measurements.

6. The method of claim 1, wherein determining, for each of the first plurality of TOA measurements, the corresponding second TOA measurement based on the reference time source comprises:

determining, based on the reference time source, a start time of each of the one or more interruption events;

determining, based on the reference time source, a start time of each of the plurality of partial measurement sessions; and determining, for each of the first plurality of TOA measurements, the corresponding second TOA measurement, based, in part, on:

the start time of each interruption event that occurs prior to the corresponding first TOA measurement, and the start time of each partial measurement session that occurs prior to the corresponding first TOA measurement.

7. The method of claim 1, wherein:

the cellular signals comprise Long Term Evolution (LTE) Positioning Reference Signals (PRS).

8. The method of claim 1, further comprising:

determining a quality metric associated with the RSTD measurements for the non-reference cells, wherein the quality metric is based, in part, on a time duration associated with each of the one or more interruption events.

9. The method of claim 1, further comprising:

reporting the corresponding RSTD measurements to a location server, and receiving a location of the UE, based, in part on the reported RSTD measurements.

10. The method of claim 1, further comprising:

determining a location of the UE based, in part on the corresponding RSTD measurements.

11. A User Equipment (UE) comprising:

a processor coupled to a memory, wherein the processor is configured to:

determine a plurality of sets of first time of arrival (TOA) measurements of cellular signals during a first measurement session, wherein:

each first TOA measurement corresponds to a cell, and each set of first TOA measurements corresponds to a distinct partial measurement session in a plurality of discontiguous partial measurement sessions caused by one or more interruption events interrupting the first measurement session;

determine, for a plurality of first TOA measurements from two or more of the plurality of sets of first TOA measurements, corresponding second TOA measurements, the corresponding second TOA measurements being determined based on a reference time source;

select, as a reference cell, a cell associated with a second TOA measurement; and determine, for each non-reference cell associated with a corresponding second TOA measurement, a corresponding reference signal time difference (RSTD) measurement relative to the selected reference cell.

12. The UE of claim 11, wherein the one or more interruption events comprise at least one of:

an Out Of Service (OOS) event; or an Inter-Frequency Handover (IFH) event.

13. The UE of claim 11, wherein the reference time source comprises at least one of:

a Global Navigation Satellite System (GNSS) Real Time Clock (RTC); or a GNSS system time from a Satellite Positioning System (SPS) Receiver coupled to the UE; or a clock or oscillator on the UE; or CDMA system time derived from a Long Term Evolution (LTE) System Information Block 8 (SIB8) message received by the UE prior to the interruption events; or GNSS system time derived from an LTE System Information Block 16 (SIB16) message received by the UE prior to the interruption events.

14. The UE of claim 11, wherein, to determine, for each corresponding second TOA measurement, the corresponding RSTD measurement, the processor is configured to:

determine the corresponding RSTD measurement based on the corresponding second TOA measurement of the selected reference cell.

15. The UE of claim 11, wherein, to select the reference cell, the processor is configured to:

select a common reference cell used by at least two partial measurement sessions, the at least two partial measurement sessions associated with two or more sets of first TOA measurements.

16. The UE of claim 11, wherein, to determine, for each of the first plurality of TOA measurements, the corresponding second TOA measurement based on the reference time source, the processor is configured to:

determine, based on the reference time source, a start time of each of the one or more interruption events;

determine, based on the reference time source, a start time of each of the plurality of partial measurement sessions; and determine, for each of the first plurality of TOA measurements, the corresponding second TOA measurement, based, in part, on:

the start time of each interruption event that occurs prior to the corresponding first TOA measurement, and the start time of each partial measurement session that occurs prior to the corresponding first TOA measurement.

17. The UE of claim 11, wherein:

the cellular signals comprise Long Term Evolution (LTE) Positioning Reference Signals (PRS).

18. The UE of claim 11, wherein the processor is further configured to:

determine a quality metric associated with the RSTD measurements for the non-reference cells, wherein the quality metric is based, in part, on a time duration associated with each of the one or more interruption events.

19. The UE of claim 11, wherein the processor is further configured to:
report the corresponding RSTD measurements to a location server, and
receive a location of the UE, based, in part on the reported RSTD measurements.

20. The UE of claim 11, wherein the processor is further configured to:
determine a location of the UE based, in part on the corresponding RSTD measurements.

21. A User Equipment (UE) comprising:
means for determining a plurality of sets of first time of arrival (TOA) measurements of cellular signals during a first measurement session, wherein:
each first TOA measurement corresponds to a cell, and
each set of first TOA measurements corresponds to a distinct partial measurement session in a plurality of discontiguous partial measurement sessions caused by one or more interruption events interrupting the first measurement session;
means for determining, for a plurality of first TOA measurements from two or more of the plurality of sets of first TOA measurements, corresponding second TOA measurements, the corresponding second TOA measurements being determined based on a reference time source;
means for selecting, as a reference cell, a cell associated with a second TOA measurement; and
means for determining, for each non-reference cell associated with a corresponding second TOA measurement, a corresponding reference signal time difference (RSTD) measurement relative to the selected reference cell.

22. The UE of claim 21, wherein the one or more interruption events comprise at least one of:
an Out Of Service (OOS) event; or
an Inter-Frequency Handover (IFH) event.

23. The UE of claim 21, wherein the reference time source comprises at least one of:
a Global Navigation Satellite System (GNSS) Real Time Clock (RTC); or
a GNSS system time from a Satellite Positioning System (SPS) Receiver coupled to the UE; or
a clock or oscillator on the UE; or
CDMA system time derived from a Long Term Evolution (LTE) System Information Block 8 (SIB8) message received by the UE prior to the interruption events; or
GNSS system time derived from an LTE System Information Block 16 (SIB16) message received by the UE prior to the interruption events.

24. The UE of claim 21, wherein means for determining, for each corresponding second TOA measurement, the corresponding RSTD measurement comprises:
means for determining the corresponding RSTD measurement based on the corresponding second TOA measurement of the selected reference cell.

25. The UE of claim 21, wherein:
the cellular signals comprise Long Term Evolution (LTE) Positioning Reference Signals (PRS).

26. A non-transitory computer-readable medium comprising executable instructions to configure a processor to:
determine a plurality of sets of first time of arrival (TOA) measurements of cellular signals during a first measurement session, wherein:
each first TOA measurement corresponds to a cell, and
each set of first TOA measurements corresponds to a distinct partial measurement session in a plurality of discontiguous partial measurement sessions caused by one or more interruption events interrupting the first measurement session;
determine, for a plurality of first TOA measurements from two or more of the plurality of sets of first TOA measurements, corresponding second TOA measurements, the corresponding second TOA measurements being determined based on a reference time source;
select, as a reference cell, a cell associated with a second TOA measurement; and
determine, for each non-reference cell associated with a corresponding second TOA measurement, a corresponding reference signal time difference (RSTD) measurement relative to the selected reference cell.

27. The computer-readable medium of claim 26, wherein the one or more interruption events comprise at least one of:
an Out Of Service (OOS) event; or
an Inter-Frequency Handover (IFH) event.

28. The computer-readable medium of claim 26, wherein the reference time source comprises at least one of:
a Global Navigation Satellite System (GNSS) Real Time Clock (RTC); or
a GNSS system time from a Satellite Positioning System (SPS) Receiver coupled to the UE; or
a clock or oscillator on the UE; or
CDMA system time derived from a Long Term Evolution (LTE) System Information Block 8 (SIB8) message received by the UE prior to the interruption events; or
GNSS system time derived from an LTE System Information Block 16 (SIB16) message received by the UE prior to the interruption events.

29. The computer-readable medium of claim 26, wherein, to determine, for each corresponding second TOA measurement, the corresponding RSTD measurement, the processor is configured to:
determine the corresponding RSTD measurement based on the corresponding second TOA measurement of the selected reference cell.

30. The computer-readable medium of claim 26, wherein, the cellular signals comprise Long Term Evolution (LTE) Positioning Reference Signals (PRS).

* * * * *